US008379237B2

(12) United States Patent
Tominaga

(10) Patent No.: US 8,379,237 B2
(45) Date of Patent: Feb. 19, 2013

(54) PRINTING SYSTEM AND METHOD FOR CONTROLLING A PRINTING SYSTEM THAT DETERMINES WHETHER TO START PRINTING ONLY AFTER COMPLETION OF DEVELOPING ALL PRINT DATA

(75) Inventor: Masahiko Tominaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/365,560

(22) Filed: Feb. 3, 2012

(65) Prior Publication Data

US 2012/0127495 A1    May 24, 2012

Related U.S. Application Data

(63) Continuation of application No. 11/563,918, filed on Nov. 28, 2006, now Pat. No. 8,139,239.

(30) Foreign Application Priority Data

Dec. 1, 2005  (JP) .................................. 2005-347937
Oct. 27, 2006  (JP) .................................. 2006-293156

(51) Int. Cl.
*G06F 3/12* (2006.01)
*G03G 15/00* (2006.01)

(52) U.S. Cl. ...................... 358/1.13; 358/1.14; 358/1.16; 358/1.17; 358/504; 358/523; 399/24; 399/29; 399/82; 399/23; 347/19

(58) Field of Classification Search ........ 358/1.13–1.15, 358/1.9, 1.16, 1.17, 523, 524, 504; 399/23, 399/24, 27, 28, 29, 31, 82; 347/19
See application file for complete search history.

(56) References Cited

U.S. PATENT DOCUMENTS

| 5,096,180 | A | * | 3/1992 | Nagaoka et al. ............... 271/110 |
| 6,266,493 | B1 | | 7/2001 | Farrell et al. |
| 6,362,893 | B1 | | 3/2002 | Francis et al. |
| 6,366,744 | B1 | | 4/2002 | Phillips et al. |
| 6,615,372 | B1 | * | 9/2003 | Wang .............................. 714/46 |
| 6,977,742 | B2 | | 12/2005 | Harper |
| 6,992,785 | B1 | * | 1/2006 | Chatcavage et al. ......... 358/1.15 |
| 7,068,958 | B2 | | 6/2006 | Fukaya |
| 7,296,870 | B2 | * | 11/2007 | Tyson et al. ..................... 347/19 |
| 7,454,796 | B2 | | 11/2008 | Mazzagatte et al. |
| 7,675,636 | B2 | | 3/2010 | Yamashita |
| 7,773,241 | B2 | | 8/2010 | Akao |
| 2001/0050781 | A1 | | 12/2001 | Kujirai |

(Continued)

FOREIGN PATENT DOCUMENTS

| EP | 1229724 | 8/2002 |
| JP | 2000-255134 A | 9/2000 |

(Continued)

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

Confidentiality of a job that requires authentication processing prior to printing is maintained as much as possible. A method for controlling a printing system is provided that is capable of receiving a plurality of types of print jobs including a first type print job that requires authentication processing prior to printing and a second type print job that does not require authentication processing prior to printing, comprising the steps of allowing the printing system to execute a specific operation for allowing the printing system to start printing of a target job in case where resources required to complete printing of the target job are present in the printing system and causing the printing system to execute the specific operation in case where the target job is the first type job.

5 Claims, 22 Drawing Sheets

U.S. PATENT DOCUMENTS

| | | |
|---|---|---|
| 2002/0027673 A1 | 3/2002 | Roosen et al. |
| 2002/0140959 A1 | 10/2002 | Harper |
| 2002/0145748 A1 | 10/2002 | Nonoyama et al. |
| 2003/0030835 A1 | 2/2003 | Yoshida et al. |
| 2004/0085565 A1* | 5/2004 | Owen et al. ............ 358/1.14 |
| 2005/0128502 A1 | 6/2005 | Yamashita |
| 2005/0179933 A1 | 8/2005 | Akao |

FOREIGN PATENT DOCUMENTS

| | | |
|---|---|---|
| JP | 2003-186657 | 7/2003 |
| JP | 2005-028826 A | 2/2005 |

* cited by examiner

FIG. 16

| ITEM | VALUE | MEANING |
|---|---|---|
| NUMBER OF COPIES | 2 | TWO COPIES |
| PAPER SIZE 1 – NUMBER OF SHEETS/COPY | 2-10 | A4 |
| PAPER TYPE 1 | 1 | PLAIN PAPER |
| PAPER SIZE 2 – NUMBER OF SHEETS/COPY | 2-15 | A3 |
| PAPER TYPE 2 | 1 | PLAIN PAPER |
| ... | ... | ... |
| DISCHARGE TRAY | 2 | TRAY 2 |
| DISCHARGE MODE | 1 | SORTED |
| STAPLER MODE | 1 | ONE UPPER LEFT POSITION |
| COLOR MODE | 1 | COLOR |
| CONFIDENTIAL PRINT SETTING | 1 | CONFIDENTIAL PRINT |
| CONFIDENTIAL PRINT PASSWORD | 1234 | PASSWORD CHARACTER STRING FOR DOCUMENT FILE |

F I G. 21

| JOB STATUS | JOB HISTORY | | |
|---|---|---|---|
| JOB TYPE | TIME | JOB NAME | STATUS |
| PDL PRINT | 10 : 39 | ESTIMATION | BEING PRINTED |
| PDL PRINT | 10 : 42 | OFFICE CIRCULAR | WAITING FOR PRINTING |
| PDL PRINT | 10 : 46 | MEETING MATERIALS | WAITING FOR PRINTING |
| CONFIDENTIAL PRINT | 10 : 37 | SALES DEPT. – IMPORTANT INFORMATION | WAITING FOR PRINTING |

CANCEL    INPUT PASSWORD

READY FOR PRINTING    CLOSE

↓ S1903

| JOB STATUS | JOB HISTORY | | |
|---|---|---|---|
| JOB TYPE | TIME | JOB NAME | STATUS |
| PDL PRINT | 10 : 39 | ESTIMATION | BEING PRINTED |
| CONFIDENTIAL PRINT | 10 : 37 | SALES DEPT. – IMPORTANT INFORMATION | WAITING FOR PRINTING |
| PDL PRINT | 10 : 42 | OFFICE CIRCULAR | WAITING FOR PRINTING |
| PDL PRINT | 10 : 46 | MEETING MATERIALS | WAITING FOR PRINTING |

CANCEL    INPUT PASSWORD

READY FOR PRINTING    CLOSE

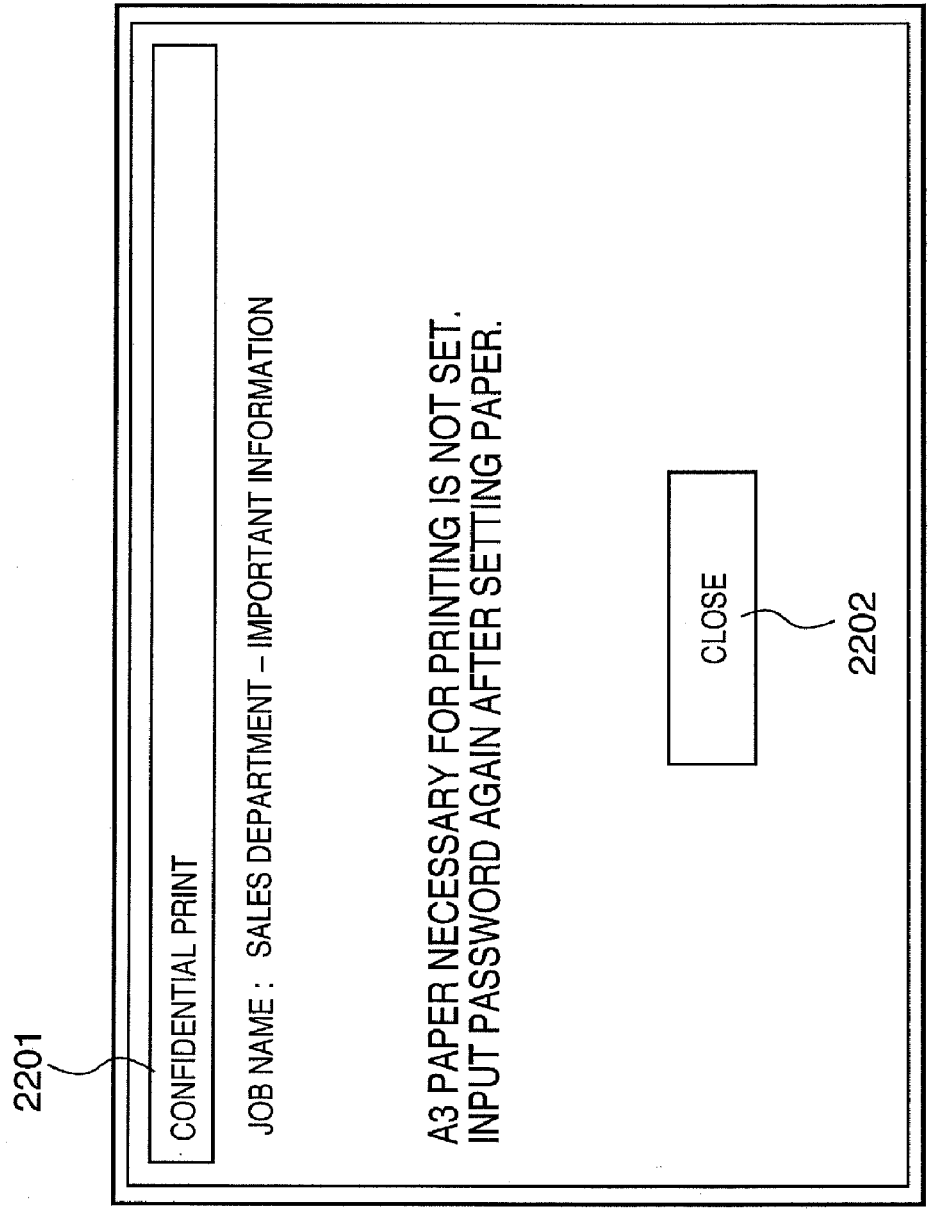

PRINTING SYSTEM AND METHOD FOR CONTROLLING A PRINTING SYSTEM THAT DETERMINES WHETHER TO START PRINTING ONLY AFTER COMPLETION OF DEVELOPING ALL PRINT DATA

This application is a continuation of U.S. patent application Ser. No. 11/563,918, filed Nov. 28, 2006, and allowed Nov. 10, 2011.

BACKGROUND OF THE INVENTION

1. Field of the Invention

The present invention relates to printing systems provided with security functions, methods for controlling printing systems, image forming apparatuses, print system controllers, and storage media.

2. Description of the Related Art

Recently, in business offices, an environment in which one printing apparatus that is connected to a network is shared by a plurality of client computers has been spreading. This is due to increased use of networked business equipment. In such an environment, it is possible that a third party removes or views the outputted printed material without permission. Such a situation becomes a problem in the case of printing while ensuring security. For example, one such situation would include printing of confidential or personal information that should not be seen by a third party.

As a method to solve the above-described problem, a function called "confidential printing" (also referred to as "secure printing") is known (for example, see Japanese Patent Application Laid-Open No. 2003-186657). In confidential printing, a printer driver that transmits a password along with the print job data is installed in advance on a client computer. Then, upon instructing a printing apparatus to perform print processing using this printer driver, the print job data and the password are transmitted to the printer. A printing apparatus that has received the print job data and the password does not start the print process immediately, but temporarily saves the print job data and the password data in a storage medium in the printing apparatus.

When a user wishes to perform printing using the printing apparatus based on the print job data, the user performs the following operations. Initially, utilizing a user interface provided on the printing apparatus, the user causes a print job list, for example, to be displayed on the user interface. Then, the user selects the target print job from the displayed job list and enters a password. Only when the entered password and the password that is stored in the storage medium together with the print job data match, does the printing apparatus start the print process based on the print job data. At this time, since the user is already in front of the printing apparatus, the user can receive the printed confidential documents without the documents being seen or removed by a third party. It should be noted that in the present specification, such a print job for which an authentication process is performed prior to printing is referred to as a "secure print job".

However, consider the case where, after the print process of a secure print job is actually started on the printing apparatus, the printing apparatus has an "out of paper" event during a secure print job. In such a case, the user may leave the printing apparatus to obtain paper for replenishment. In other words, the possibility that the proper user is absent in front of the printing apparatus for a certain period of time can be foreseen. In such a case, there may arise the possibility that a third party sees the printed materials of the secure print job during the absence of the proper user and the confidentiality of the print data is compromised. As one of countermeasures to the above-described problem, the user of the secure print job may, when the user leaves the printing apparatus to deal with an "out of paper" event or the like, remove the material already printed in order to keep them confidential. However, remaining problems can be anticipated which are difficult to address even with such a countermeasure. For example, if certain finishing processing such as stapling are specified for the secure print job, a new problem that may arise is that the desired finishing processing cannot be performed if the printed materials are removed before the completion of the print process.

In addition, upon recovery from an event such as an "out of paper" event, even if paper for replenishment is prepared near the printing apparatus, a certain period of time is required to perform the recovery process. In this case, the time required from the start of printing of the secure print job to the completion thereof is prolonged by the time taken for performing the recovery process compared with the time required in the case where printing is completed without the recovery processing. In other words, it is anticipated that the printed output of the secure print job is exposed to a higher risk of being seen by a third party in the case where printing of the secure print job is completed with the recovery process, compared to the case where printing of the secure print job can be completed without the recovery process.

Further, it is important to ensure that, in dealing with a problem such as the one described above, other new problems do not arise, thereby reducing productivity. Thus, there still remain problems with regard to secure print jobs.

SUMMARY OF THE INVENTION

The present invention provides printing systems and methods for controlling printing systems that overcome the above-described problem.

An object of the present invention is to build a practical printing environment that can flexibly address the problems described in the section "Description of the Related Art".

For example, it is an object of the present invention to reduce the possibility that an interrupting event occurs during a job that requires authentication prior to printing after printing has started, so as to maintain confidentiality of jobs that require authentication prior to printing. A further object of the present invention is to reduce the possibility that, in order to achieve the above objects, the desired finishing processing is not performed for the printed material of jobs that require authentication prior to printing.

It is a further object of the present invention to prevent, as much as possible, new problems such as that the productivity of other jobs is affected in order to achieve the above-described object.

Objects of the present invention are to maintain confidentiality of jobs that require authentication prior to printing, reduce the possibility that other problems where desired finishing processing is not performed arise, and also to prevent, as much as possible, the arising of other problems such as that the productivity of other jobs is affected.

According to one aspect of the present invention, there is provided a printing system capable of receiving a plurality of types of print jobs including a first type of print job that requires authentication processing prior to printing and a second type of print job that does not require authentication processing prior to printing, the printing system comprising: a controller adapted to allow the printing system to execute a specific operation for allowing the printing system to start printing of a target job with the printing system, in a case where resources required to complete printing of the target job are present in the printing system, wherein the controller causes the printing system to execute the specific operation in the case where the target job is a print job of the first type.

According to another aspect of the present invention, there is provided a method for controlling a printing system capable of receiving a plurality of types of print jobs including a first type of print job that requires authentication processing prior to printing and a second type of print job that does not require authentication processing prior to printing, comprising the steps of: allowing the printing system to execute a specific operation for allowing the printing system to start printing of a target job, in a case where resources required to complete printing of the target job are present in the printing system, and causing the printing system to execute the specific operation in case where a target job is a print job of the first type.

According to another aspect of the present invention, there is provided an image forming apparatus that performs the above described method for controlling a printing system.

According to another aspect of the present invention, there is provided a controller of a printing system that performs the above described method for controlling a printing system.

Further features of the present invention will become apparent from the following description of exemplary embodiments with reference to the attached drawings.

BRIEF DESCRIPTION OF THE DRAWINGS

The accompanying drawings, which are incorporated herein and constitute a part of the specification, illustrate embodiments of the invention and, together with the description, serve to explain the principle of the invention.

FIG. 16 is a diagram showing an example of print information indicating print settings and paper to be used for printing according to the first embodiment.

FIG. 21 is a diagram showing an example of the print status screen displayed when priority processing at the start of a confidential print is performed in the second embodiment.

FIG. 22 is a diagram showing an exemplary warning screen according to a third embodiment.

DESCRIPTION OF THE EMBODIMENTS

Preferred embodiments of the present invention will now be described in detail in accordance with the accompanying drawings.

First Embodiment

Figure 1:
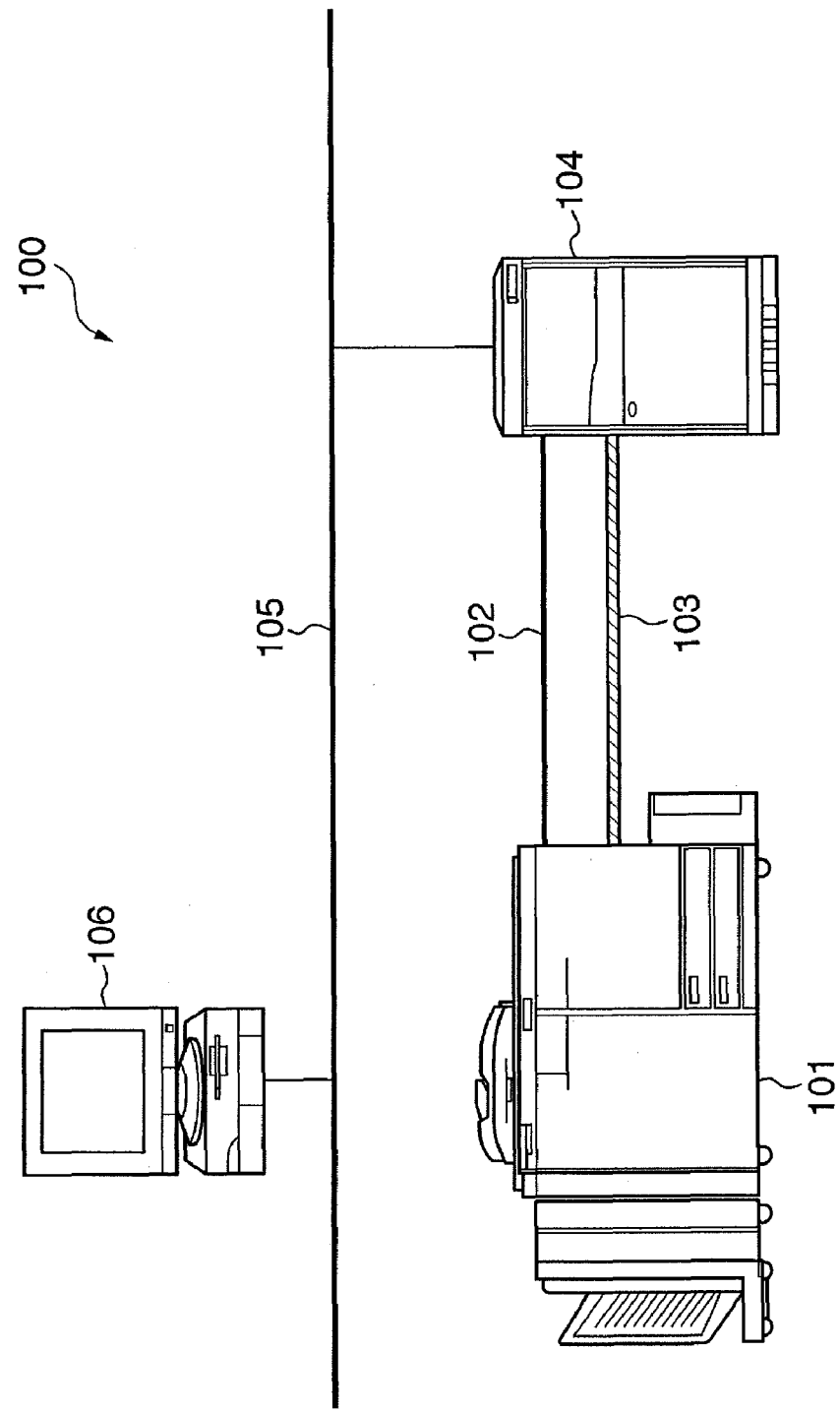
FIG. 1 is a diagram showing a printing system of a first embodiment.
Figure 2:
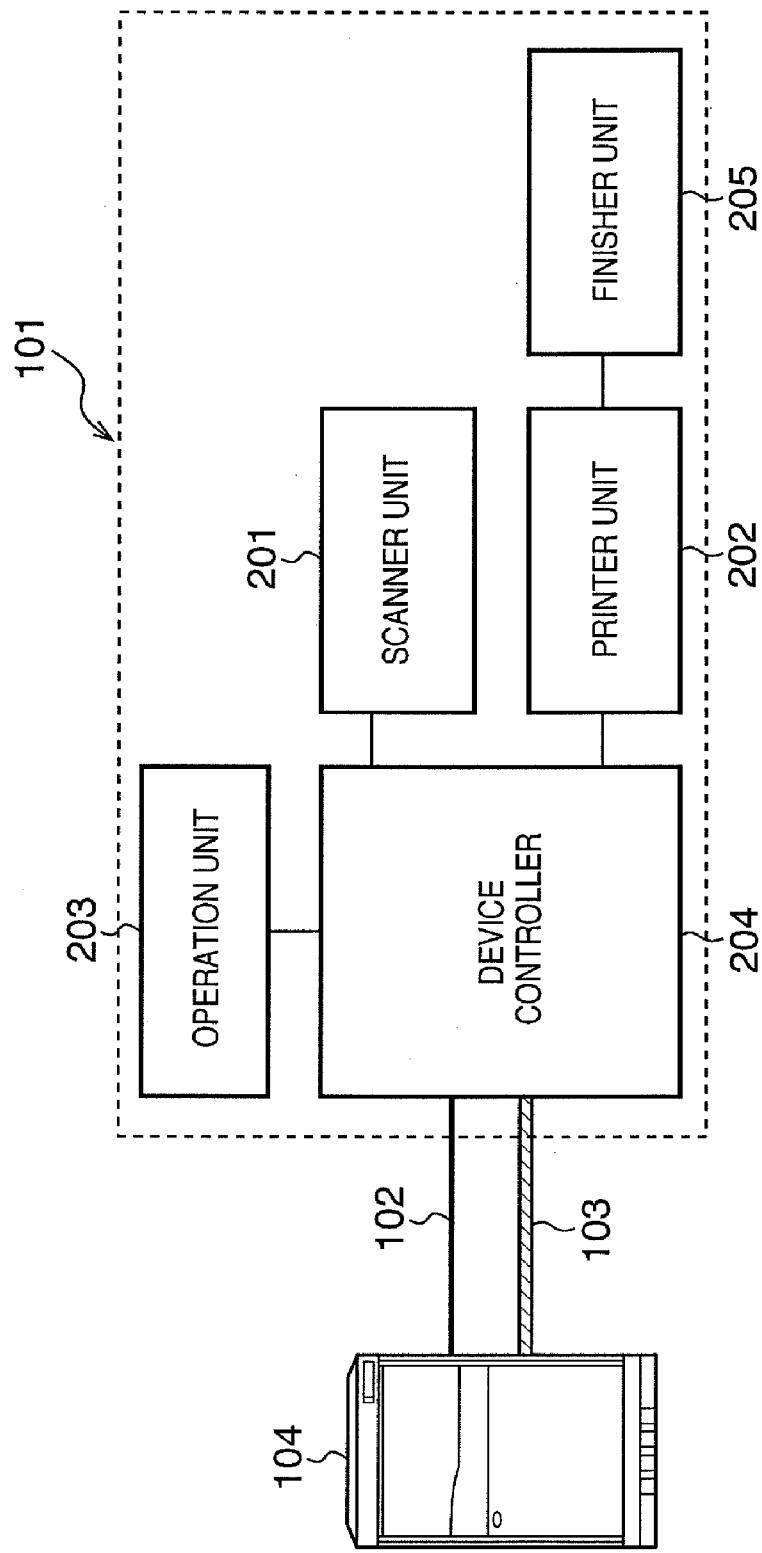
FIG. 2 is a block diagram showing a configuration of an image forming apparatus of the first embodiment.

FIG. 1 is a block diagram showing a configuration of a printing system 100 according to a first embodiment. FIG. 2 is a block diagram showing a configuration of an image forming apparatus 101 in the printing system 100 according to the first embodiment. An overview of functions of the printing system of the present embodiment is described with reference to FIGS. 1 and 2.

An image forming apparatus 101 is a color scanner/printer apparatus that can perform full-color scanning, full-color printing and the like. The image forming apparatus 101 is connected to an external controller 104 via an internal network 102 and a video cable 103 for transmitting image data. The external controller 104 is connected to an external network 105. A computer terminal 106 is connected to the external network 105. Accordingly, the image forming apparatus 101 is connected to the computer terminal 106 via the external network 105.

As shown in FIG. 2, the image forming apparatus 101 includes a scanner unit 201 and a printer unit 202, and is provided with a copy function for printing an image that has been read with the scanner unit 201 with the printer unit 202. An operation unit 203 serves as a user interface. That is, the operation unit 203 has an input device for a user to instruct performing a function of the image forming apparatus 101 or to perform operation settings in order to perform that function. In addition, the operation unit 203 includes a display device for informing a user of the state of the image forming apparatus 101.

A device controller 204 inside the image forming apparatus 101 performs the overall operation control, state control and image processing of the image forming apparatus 101. For example, the device controller 204 controls the operation of the scanner unit 201 and the printer unit 202 as described above, and performs processes for user instructions/state displays from an operation unit 203. The device controller 204 also processes image data handled in the scanner unit 201 or the printer unit 202, and controls data transmission with the external controller 104 that is connected via the internal network 102. It should be noted that a finisher unit 205 for performing postprocessing activities such as stapling is connected downstream of the printer unit 202. The finisher unit 205 is an optional unit, and the image forming apparatus 101 does not have to be provided with the finisher unit 205.

In the printing system 100 of the present embodiment, a document prepared by a computer is transmitted from the computer terminal 106 to the external controller 104 via the external network 105 in the form of page-description language (PDL) data. The external controller 104 develops the received PDL image data into an image, and creates image data in a format that can be printed with the image forming apparatus 101. The external controller 104 transmits the created image data to the image forming apparatus 101 via the video cable 103, and at the same time communicates operation settings during printing and various types of information related to the image data to be sent out via the video cable 103, using the internal network 102. The image forming apparatus 101 performs printing based on the image data received from the external controller 104 via the video cable 103 and the various types of information received via the internal network 102. In this manner, the printing system 100 of the present embodiment realizes a network printer function for printing the PDL data transmitted from the computer terminal 106 via a network with the image forming apparatus 101.

The external controller 104 has a function for developing the PDL data sent out from the computer terminal 106 into an image in two types of color spaces, namely, RGB color space and CMYK color space, using profiles for performing color space conversion. The external controller 104 transfers images expressed in the RGB and CMYK color spaces onto the video cable 103. It should be noted that the RGB color space is a color space for expressing colors with red, green and blue. Similarly, the CMYK color space is a color space for expressing colors with cyan, magenta, yellow and black.

Further, the printing system of the present embodiment has a network scanning function for displaying/saving images scanned with the image forming apparatus 101 on the computer terminal 106. The network scanning function can be roughly classified into a pull scanning function and a push scanning function according to the operational mode. In the pull scanning function, a scanning instruction by the user is provided with the computer terminal 106. In the push scanning function, a scanning instruction by the user is provided with the operation unit 203 of the image forming apparatus 101. Specifically, the two functions differ with regard to the mode in which scanning instructions are provided. However, in both the pull scanning function and the push scanning function, the image forming apparatus 101 reads an image of an original placed in advance in the scanner unit 201 in response to an instruction by the user. Then, the image forming apparatus 101 transfers the read image to the computer terminal 106 in a format suitable for handling with the computer terminal 106 via the internal network 102, the external controller 104 and the external network 105.

The image forming apparatus 101 of the printing system of the present embodiment deals with full-color images, and therefore has an image quality adjusting function to improve the image quality of the printer unit 202. Such an image quality adjusting function includes two types of adjustments, that is, density adjustment performed solely by the image forming apparatus 101 and image quality adjustment performed by printing an electronic document from the computer terminal 106.

In performing the density adjustment solely by the image forming apparatus 101, an image obtained by printing a specified image with the printer unit 202 is initially read with the scanner unit 201. The characteristics of the printer unit 202 obtained based on this reading are reflected by values of density adjustment, which is performed during image processing by the device controller 204. Due to this adjustment, stable images can be printed. The specified image used for printing for the density adjustment is created by the device controller 204.

On the other hand, image quality adjustment by printing the electronic document from the computer terminal 106 is performed under the control of the external controller 104. Initially, a specified image is transmitted to the image forming apparatus 101 from the external controller 104, and causes the printer unit 202 to print the same. Then, the printed image is read with the scanner unit 201, and the read image is sent to the external controller 104. The external controller 104 recognizes image characteristics of the image forming apparatus 101 based on the received image. Then, the recognized characteristics are maintained by the external controller 104 as values that the external controller 104 references when it develops the PDL data from the computer terminal 106 into an image.

[Configuration of the Device Controller 204]

Figure 3:
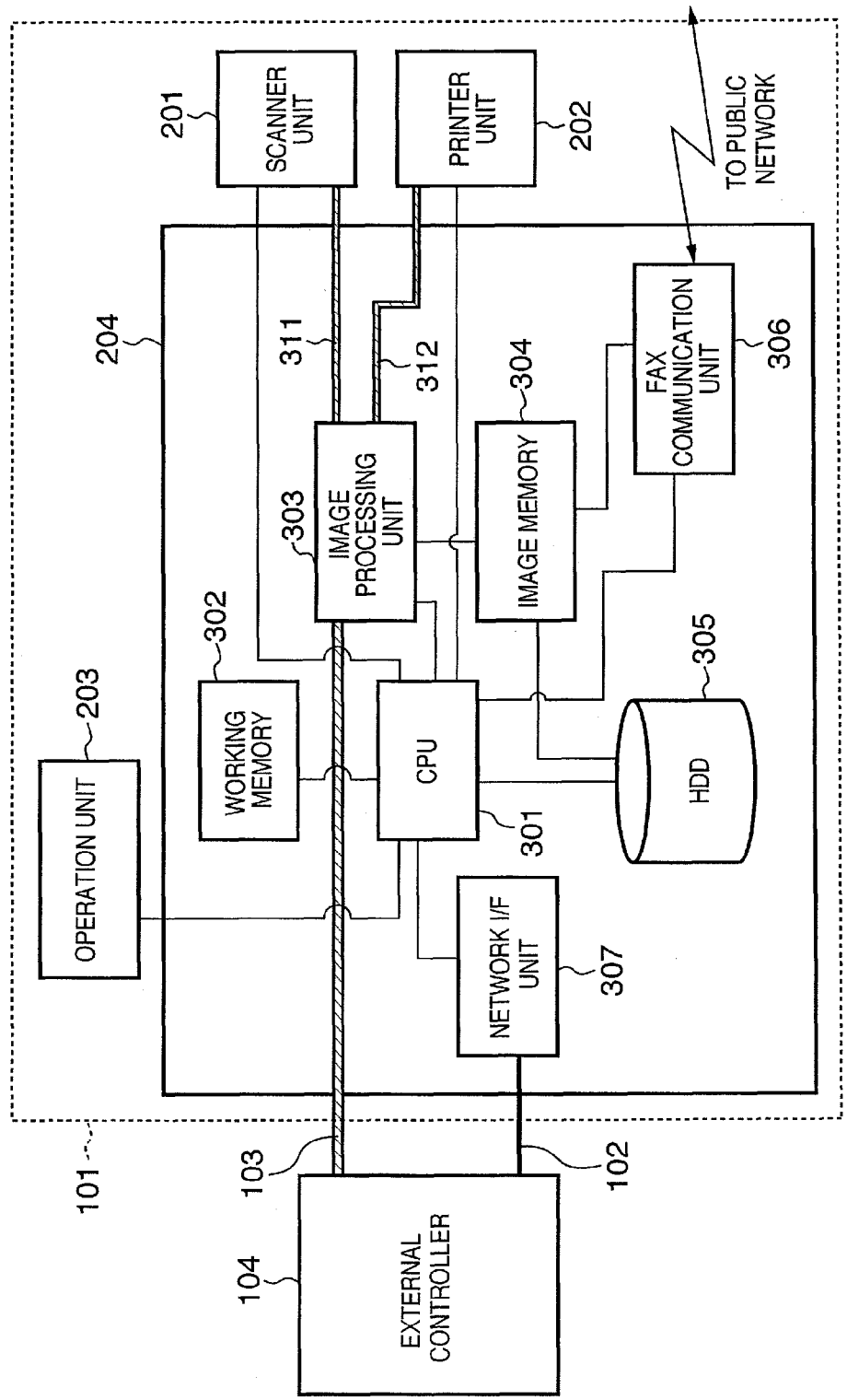
FIG. 3 is a block diagram showing a detailed configuration of a device controller of the image forming apparatus.

Next, the configuration of the device controller 204 is described with reference to FIG. 3. The device controller 204 includes a CPU 301, a working memory 302, an image processing unit 303, an image memory 304, a high capacity storage device (hereinafter referred to as the "HDD") 305, a facsimile (FAX) communication unit 306, and a network I/F unit 307. The image processing unit 303 is connected to the scanner unit 201 and the printer unit 202 via image signal lines 311 and 312, and also connected to the external controller 104 via the video cable 103. Further, the image processing unit 303 is connected to the image memory 304. The FAX communication unit 306 is connected to the image memory 304.

Image data read with the scanner unit 201 is stored in the HDD 305 via the image processing unit 303 and the image memory 304. The stored image data is sent out to the printer unit 202 via the image memory 304 and the image processing unit 303 for printing. Similarly, image data inputted from the external controller 104 via the video cable 103 is stored in the HDD 305 via the image processing unit 303 and the image memory 304. Also, it is possible to perform input and output of image data used for facsimile transmission with the FAX communication unit 306. By using the function of storing images in the HDD 305, it is possible to accumulate in the HDD 305 image data inputted from the scanner unit 201 or image data inputted from the external controller 104 via the video cable 103, without immediately outputting the same to the outside. Consequently, a so-called box function is realized. With the box function, it is possible to print/fax, in accordance with the instructions from the operation unit 203, the images accumulated in the HDD 305 when the user desires to print or fax the same, or to share the images accumulated in the HDD 305 among a plurality of users.

Further, the printing system of the present embodiment is provided with a file transmitting function for sending out images accumulated in the HDD 305 to a desired computer terminal connected to the external network 105 to reuse the sent image with the computer terminal. In this file transmitting function, the image processing unit 303 converts the image accumulated in the HDD 305 to an image of a file format that is generally used in computer terminals, or the like (e.g., JPEG). A file converted in this manner can be sent out to a desired computer terminal via the network interface unit 307, the internal network 102, the external controller 104 and the external network 105.

The CPU 301 operates in accordance with programs stored in the HDD 305, and also controls the operation unit 203. The CPU 301 controls various processing units such as the FAX communication unit 306 of the apparatus. The CPU 301 communicates with the printer unit 202 and the scanner unit 201 to synchronize image data transmission. Further, the CPU 301 accesses the network interface unit 307 to communicate with the external controller 104 via the internal network 102.

The device controller 204 transmits data stored in the HDD 305 to the computer terminal 106 via the internal network 102 and the external controller 104 using a Web service or the like. Conversely, information from the computer terminal 106 can be stored in the image memory 304 or the HDD 305 via the internal network 102 and the external controller 104 using a Web service or the like. In this manner, a remote operation service can be provided in which it is possible to reference the state of the image forming apparatus 101 or to perform settings of the image forming apparatus 101 with the computer terminal 106.

[Operation Unit 203]

Figure 4:
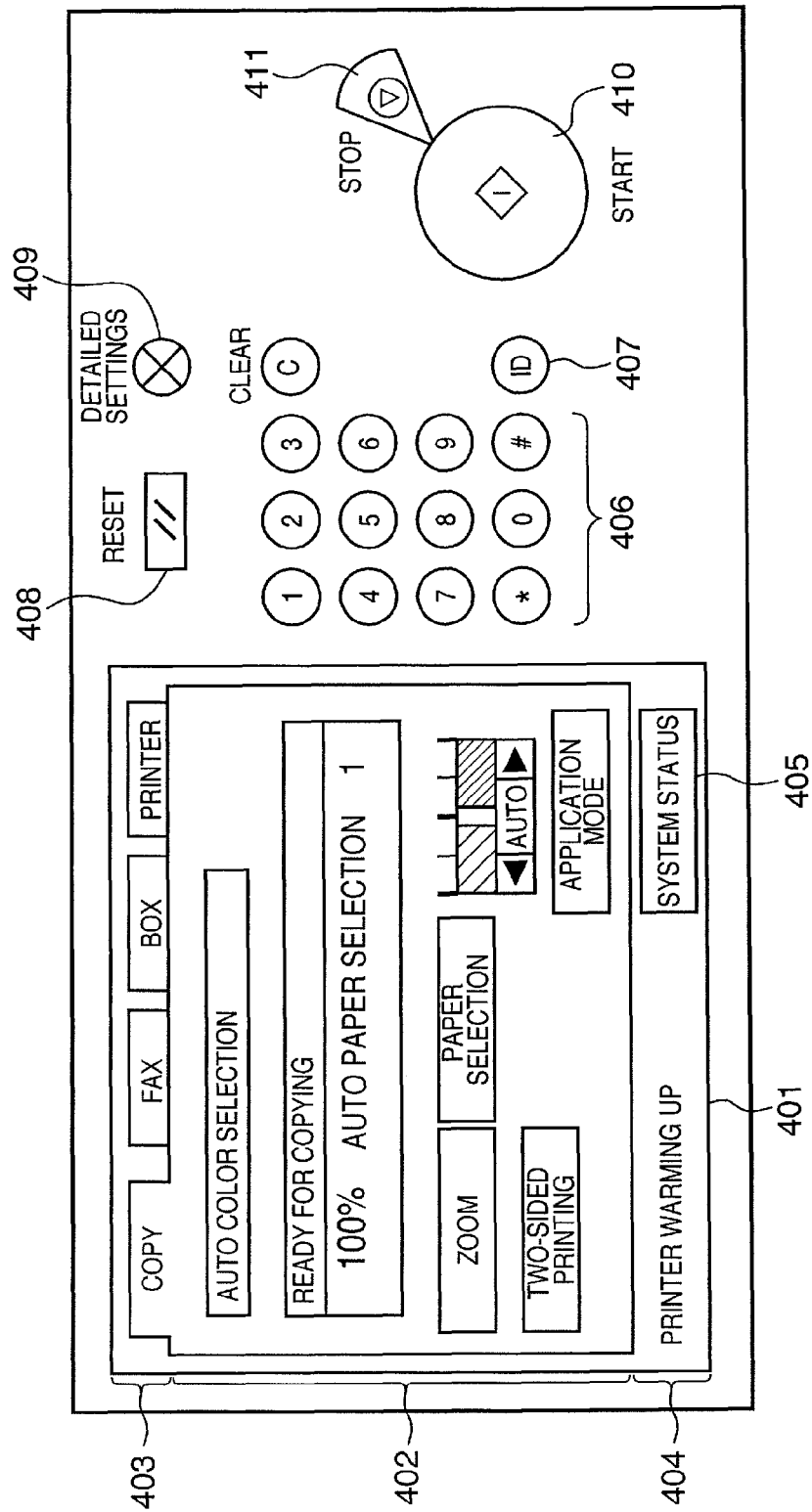
FIG. 4 is a diagram showing an operation unit of the image forming apparatus.

Next, the operation unit 203 of the image forming apparatus 101 is described with reference to FIG. 4. The operation unit 203 has an LCD display screen 401. The setting status and the operation status of the image forming apparatus 101 are displayed on the LCD display screen 401. As an example, a copy screen is displayed on an operation setting screen 402 in FIG. 4. Zoom settings, paper supply tray settings, the number of printed copies or the like for copying are displayed on the copy screen. The display on the LCD display screen 401 changes to screens for using the facsimile function and print function with the external controller 104, in response to the selection of a function key 403 on the operation setting screen 402. At the bottom of the liquid crystal display (LCD) screen 401, a status message display portion 404 is provided that indicates the state of the image forming apparatus 101 or the status of a function other than the function of the selected function screen. Also, at the lower right, a system status key 405 is capable of changing the operation setting screen 402 to a system status screen. The state of the image forming apparatus 101 or detailed status of functions other than the function of the selected function screen can be referenced in the system status screen. The system status screen is described later with reference to FIG. 12.

The operation unit 203 has a numeric keypad 406 for inputting numeric settings. An ID key 407 is for changing the display on the LCD display screen 401 to an ID input screen for inputting a user ID for identifying the user using the apparatus. When various functions such as copying or faxing of the image forming apparatus 101 are used, it is required to input the user ID for identifying the user using the apparatus. The ID input screen is used for inputting the user ID. A reset key 408 returns the setting state of each function set through the operation setting screen 402 to the default setting state. A detailed setting key 409 is for changing the display on the LCD display screen 401 to a screen for performing detailed operation settings of the image forming apparatus 101, network settings or the like. A start key 410 and a stop key 411 are buttons for starting or stopping the operation of each function.

[Configuration of the Scanner Unit 201]

Figure 5:
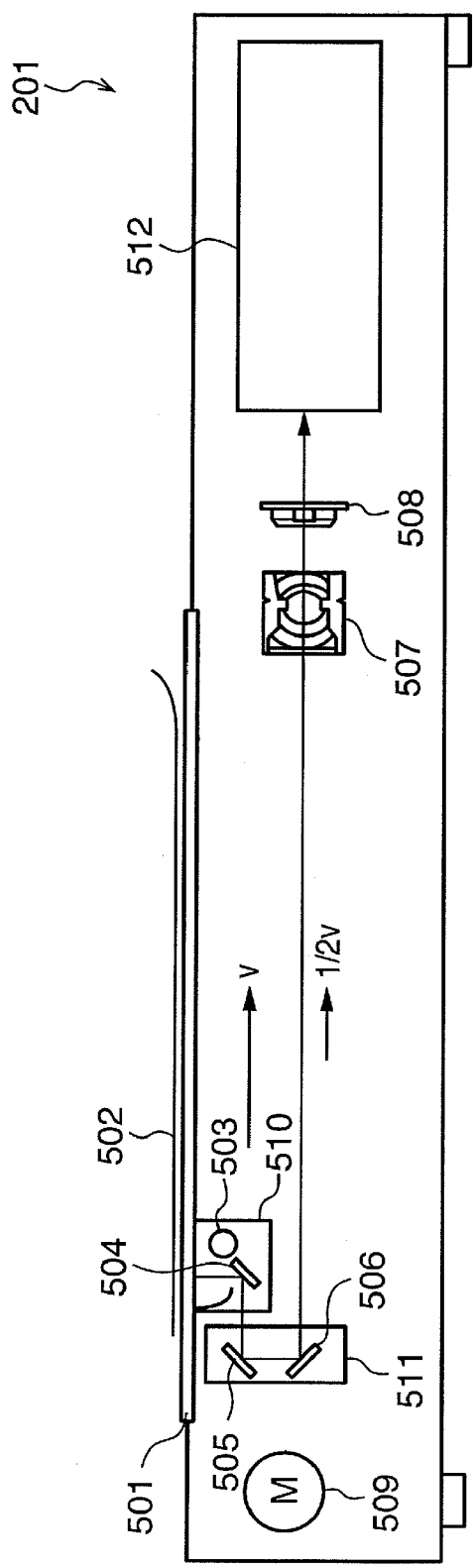
FIG. 5 is a diagram showing a detailed configuration of a scanner unit of the image forming apparatus.

The configuration of the scanner unit 201 is described with reference to FIG. 5. An original 502 to be read is placed on a platen glass 501. The original 502 is irradiated by an illuminating lamp 503, and the reflected light forms an image on a CCD 508 by a lens 507 via mirrors 504, 505 and 506. A first mirror unit 510 including the mirror 504 and the illuminating lamp 503 moves at a velocity of v, and a second mirror unit 511 including the mirrors 505 and 506 moves at a velocity of v/2. As a result of the first and second mirror units 510 and 511 moving in this manner, the entire surface of the original 502 is scanned. The first mirror unit 510 and the second mirror unit 511 are driven by a motor 509. The operation of the respective mirror units 510 and 511 of the scanner unit 201 is controlled by signals from a scanner controller unit 512. The scanner controller unit 512 controls the operation of the mirror units 510 and 511 in accordance with instructions from the device controller 204.

Figure 6:
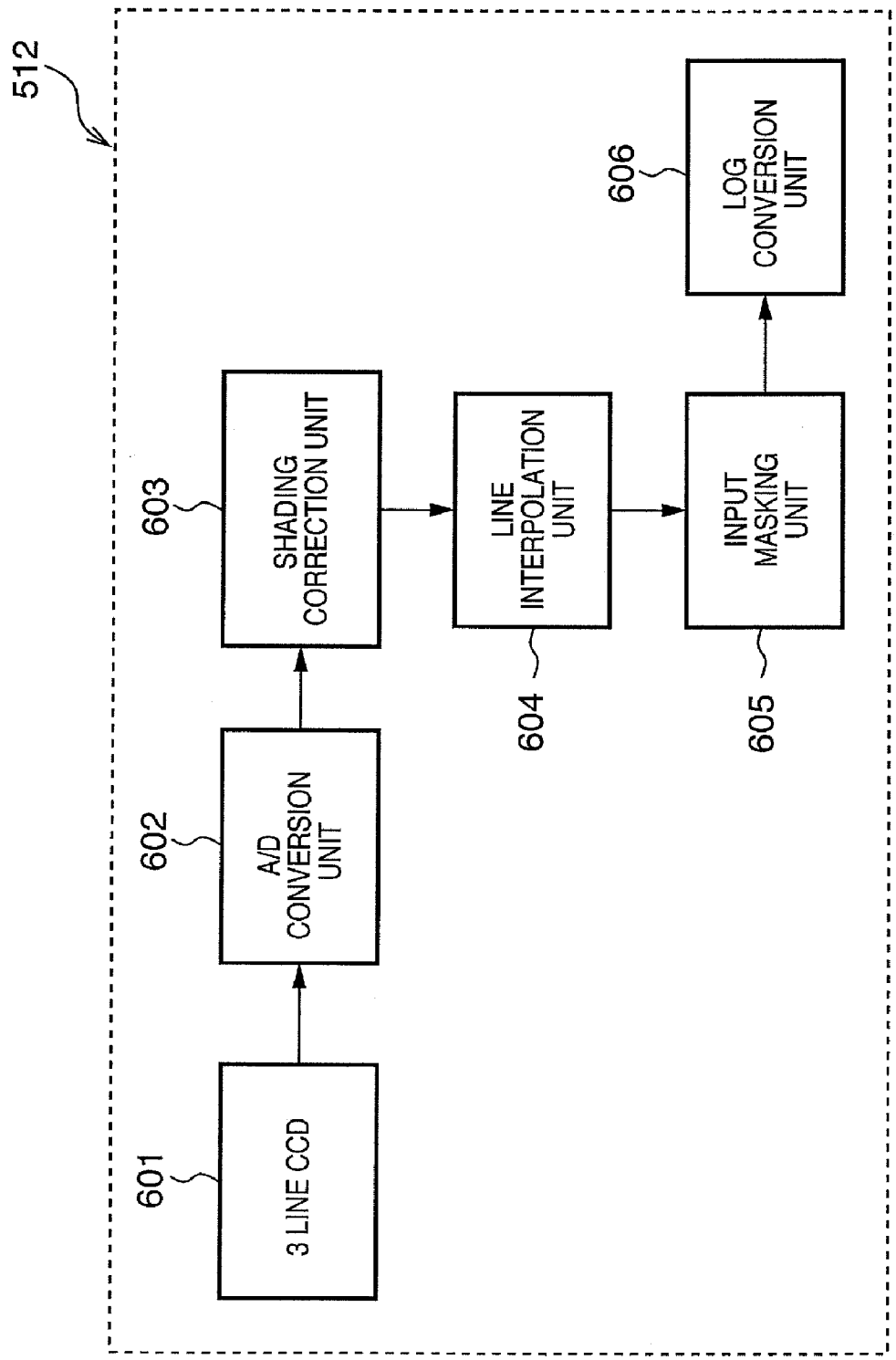
FIG. 6 is a block diagram showing a configuration of a scanner controller of the image forming apparatus.

Next, image processing with the scanner controller unit 512 is described with reference to FIG. 6. Inputted optical signals are converted into electric signals by a CCD sensor 601. The CCD sensor 601 is an RGB three-line color sensor and each image signal of R, G and B is inputted to an A/D conversion unit 602. The A/D conversion unit 602 initially performs gain adjustment and offset adjustment to the inputted image signals, and thereafter converts the signal of each color to 8-bit digital image signals R0, G0 and B0 with an A/D converter. A shading correction unit 603 performs publicly known shading correction using read signals of a standard white board for each color. The respective color line sensors of the CCD sensor 601 are disposed mutually spaced apart at a predetermined distance. Therefore, such spatial displacement in the sub-scanning direction is corrected by a line delay adjustment circuit (line interpolation unit) 604.

An input masking unit 605 converts the read color space that is determined by the spectral characteristics of R/G/B filters of the CCD sensor 601 into the NTSC standard color space. The input masking unit 605 converts the inputted signals (R0, G0 and B0) into standard signals (R, G and B), through a 3×3 matrix operation using constants peculiar to the apparatus that is obtained taking into account various characteristics such as sensitivity characteristics of the CCD sensor 601, spectral characteristics of the illuminating lamp and the like. A luminance/density conversion unit (LOG conversion unit) 606 is constituted by a look-up table (LUT), and converts luminance signals of RGB into density signals of C1, M1 and Y1. Signals converted in this manner are sent out to the device controller 204.

[Configuration of the Printer Unit 202]

Figure 7:
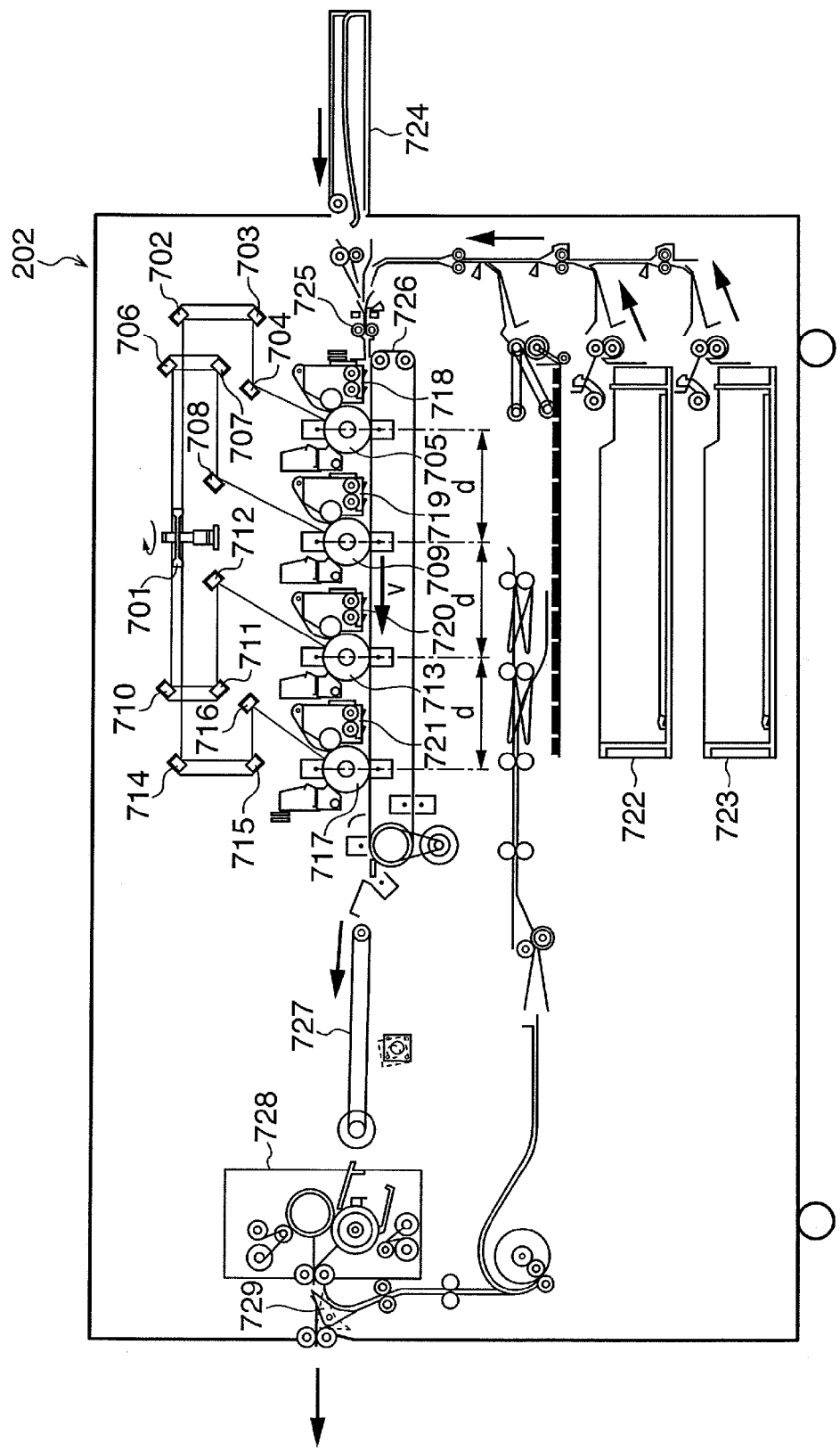
FIG. 7 is a diagram showing a detailed configuration of a printer unit of the image forming apparatus.

FIG. 7 shows a schematic view of the printer unit 202. A polygon mirror 701 receives four laser beams emitted by a semiconductor laser driving unit. One of the laser beams scans a photosensitive drum 705 through mirrors 702, 703 and 704. Another laser beam scans a photosensitive drum 709 through mirrors 706, 707 and 708. Another laser beam scans a photosensitive drum 713 through mirrors 710, 711 and 712. Another laser beam scans a photosensitive drum 717 through mirrors 714, 715 and 716.

On the other hand, a developing device 718 supplies yellow (Y) toner and forms a yellow toner image by developing a latent image formed on the photosensitive drum 705 in accordance with the scanning of the laser beam. A developing device 719 supplies magenta (M) toner and forms a magenta toner image by developing a latent image formed on the photosensitive drum 709 in accordance with the scanning of laser beam. A developing device 720 supplies cyan (C) toner and forms a cyan toner image by developing a latent image formed on the photosensitive drum 713 in accordance with the scanning of the laser beam. Further, a developing device 721 supplies black (K) toner and forms a black toner image by developing a latent image formed on the photosensitive drum 717 in accordance with the scanning of the laser beam. Toner images of the above four colors (Y, M, C and K) are transferred to a sheet and a full-color output image is obtained.

A sheet supplied from one of the sheet cassettes 722 and 723 and a manual feed tray 724 adheres to a transfer belt 726 after passing through registration rollers 725, and is transported. In synchronization with the timing of paper supply, toners of various colors are developed on the photosensitive drums 705, 709, 713 and 717 in advance, and the toners are transferred to the sheet as the sheet is transported. After the toners of various colors have been transferred to the sheet, the sheet is separated from the transfer belt 726, and transported to a fixing device 728 by a carrying belt 727. The toners are fixed to the sheet in the fixing device 728. After the sheet has passed through the fixing device 728, it is temporarily guided downward by a flapper 729. After the rear end of the sheet has passed through the flapper 729, the sheet is switched back and discharged. As a result, the sheet is discharged with its surface facing down, so that sheets are discharged in the correct page order when a document is printed out sequentially from the first page.

It should be noted that the four photosensitive drums 705, 709, 713 and 717 are disposed at equal intervals of a distance d. The transfer belt 724 transports the sheet at a constant velocity of v (however, it has no relation with the moving velocity v of the first mirror unit 510 of the scanner unit). The polygon mirror 701 and the semiconductor laser are driven such that toner images are formed on the photosensitive drums in synchronization with the timing corresponding to the positional relation and the transport velocity.

[Configuration of the Finisher Unit 205]

Figure 8:
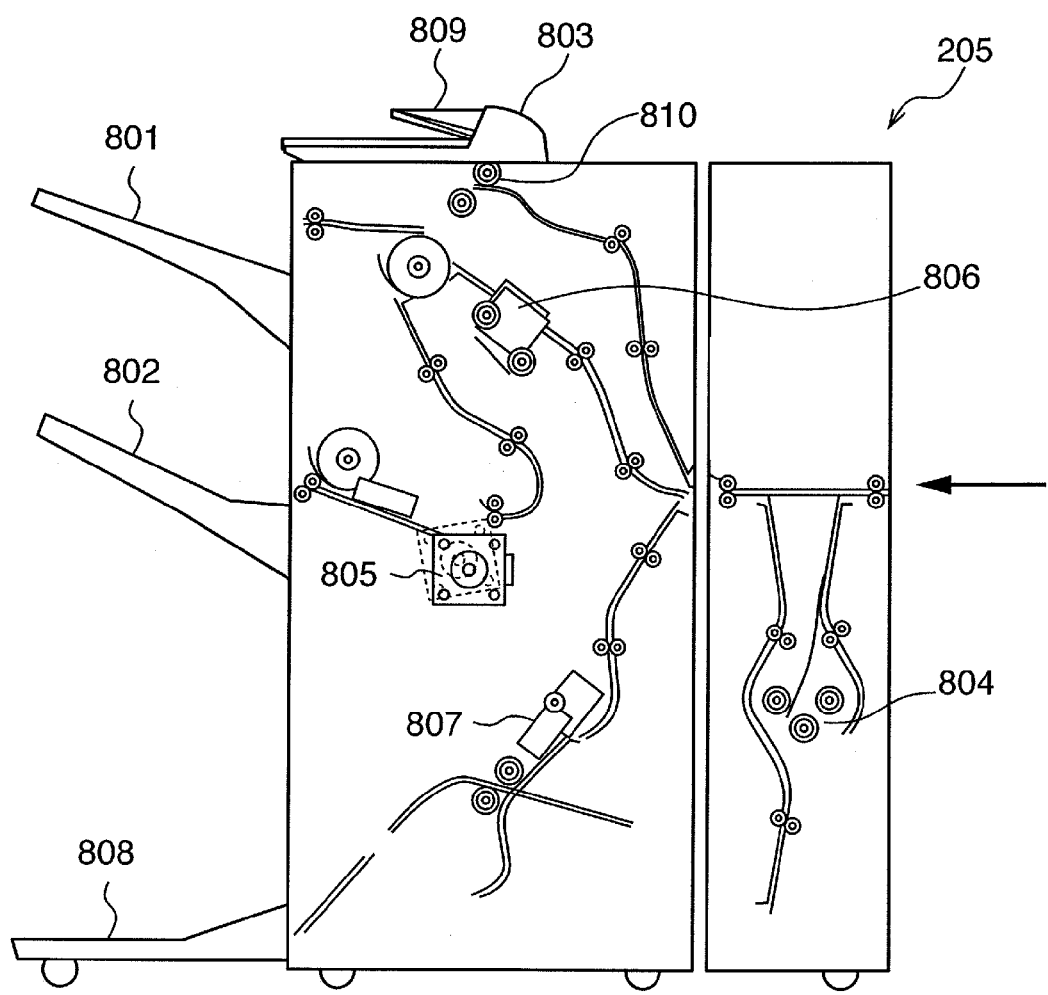
FIG. 8 is a diagram showing a configuration of a finisher unit of the image forming apparatus.

FIG. 8 shows a schematic view of the finisher unit 205. The sheet discharged through the fixing device 728 of the printer 202 enters the finisher unit 205. The finisher unit 205 includes a sample tray 801 and a stack tray 802. The tray to which the sheet is discharged is switched depending on the job type or the number of sheets to be discharged.

There are two sorting methods. One is a bin sorting method that uses a plurality of bins to distribute outputted sheets to every bin for each job. The other is a shift sorting method for distributing outputted sheets for each job by using an electric sorting function described below and by shifting the bin (or tray) to the rearward and frontward directions in FIG. 8. The electric sort function is called "collating". If the above-described device controller 204 has a high-capacity memory (for example, the image memory 304 or the HDD 305), a so-called collating function in which the order of the buffered pages and the order in which the pages are discharged are made different using such a memory can be performed, thus supporting the electric sorting function. It should be noted that a grouping function is for sorting sheets for each page, while the sorting distributes discharged sheets for each job.

When sheets are discharged to the stack tray 802, it is possible that sheets that are ready to be discharged are stored for each job, and bound by a stapler 805 immediately before being discharged. In addition, a Z-folding device 804 for folding a sheet in the shape of the letter "Z" and a puncher 806 for punching two (or three) holes for filing in a sheet are also provided before a sheet is discharged to either of the above-described two trays. They perform respective processes depending on the job type.

Further, a saddle-stitcher 807 folds sheets into two by letting the central area of the sheets be pinched by rollers after binding the sheets at two locations in the central area so as to manufacture a booklet such as magazines or pamphlets. The sheets subjected to book binding with the saddle-stitcher 807 are discharged to a booklet tray 808.

In addition, although not shown in FIG. 8, it is also possible to add finisher units for glue binding (starching) for book binding or for trimming (cutting) to trim the end surface of the side opposite to the bound side after binding.

Also, an inserter 803 is for forwarding a sheet set in a tray 809 to one of the trays 801, 802 and 808 without letting the sheet pass through the printer. With the inserter 803, it is possible to insert (put in) a sheet set to the inserter 803 between sheets forwarded to the finisher 205. Sheets to be inserted are set by the user with the surface facing up in the tray 809 of the inserter 803. Then a pickup roller 810 feeds the sheets in order from top to bottom into the finisher unit 205. Accordingly, by transporting the sheets from the inserter 803 directly to the trays 801 or 802, the sheets are discharged with the surface facing down. When a recording sheet is forwarded to the saddle-stitcher 807, the sheet is once forwarded to the side of the puncher 806, and then forwarded to the saddle-stitcher 807 after being switched back, thereby making the surface facing directions consistent.

[External Controller 104]

Figure 9:
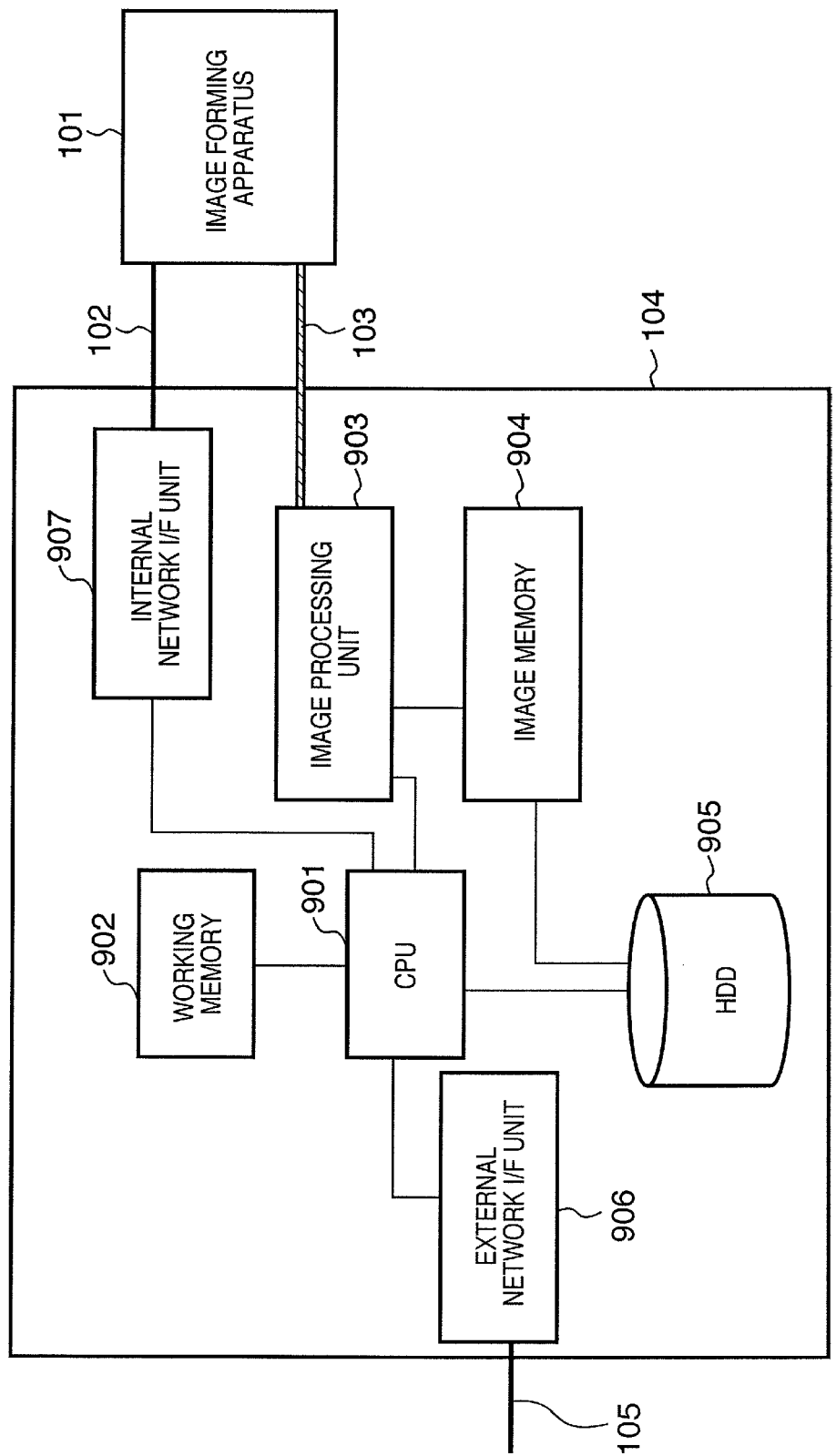
FIG. 9 is a block diagram showing a configuration of an external controller of the first embodiment.

Next, the configuration of the external controller 104 and operation thereof during printing are described with reference to FIG. 9. The external controller 104 includes a CPU 901, a working memory 902, an image processing unit 903, an image memory 904, a high-capacity storage device (hereinafter referred to as the "HDD") 905, an external network I/F unit 906 and an internal network I/F unit 907.

The image processing unit 903 is connected to the image forming apparatus 101 via the video cable 103. The image processing unit 903 is also connected to the image memory 904. The external network I/F unit 906 is connected to the external network 105, and the internal network I/F unit 907 is connected to the internal network 102. The CPU 901 operates in accordance with programs stored in the HDD 905 and communicates with the computer terminal 106 and the image forming apparatus 101 via the network I/F units 906 and 907, to perform prescribed processes.

Next, the operation of the external controller 104 (control by the CPU 901) when a document file on the computer terminal 106 is printed is described. The external controller 104 receives via the external network 105 PDL data transmitted from the computer terminal 106 with the external network I/F unit 906. The PDL data received by the external network I/F unit 906 is accumulated in the HDD 905. Then, the CPU 901 uses the image processing unit 903 to develop the PDL data accumulated in the HDD 905 as an image in the image memory 904. The image processing unit 903 transfers the developed image to the image forming apparatus 101 via the video cable 103. At this time, the CPU 901 transmits print attribute information of the developed image to the image forming apparatus 101 via the internal network I/F unit 907 and the internal network 102. The print attribute information contains information on the size or the like of the developed image and settings for printing performed with the image forming apparatus 101 contained in the PDL data, or the like. In this manner, the image forming apparatus 101 prints an image on a sheet based on the print attribution information transmitted from the external controller 104 and the developed image.

[Printer Driver]

Next, a printer driver that operates on the computer terminal 106 is described with reference to FIGS. 10 and 11.

Figure 10:
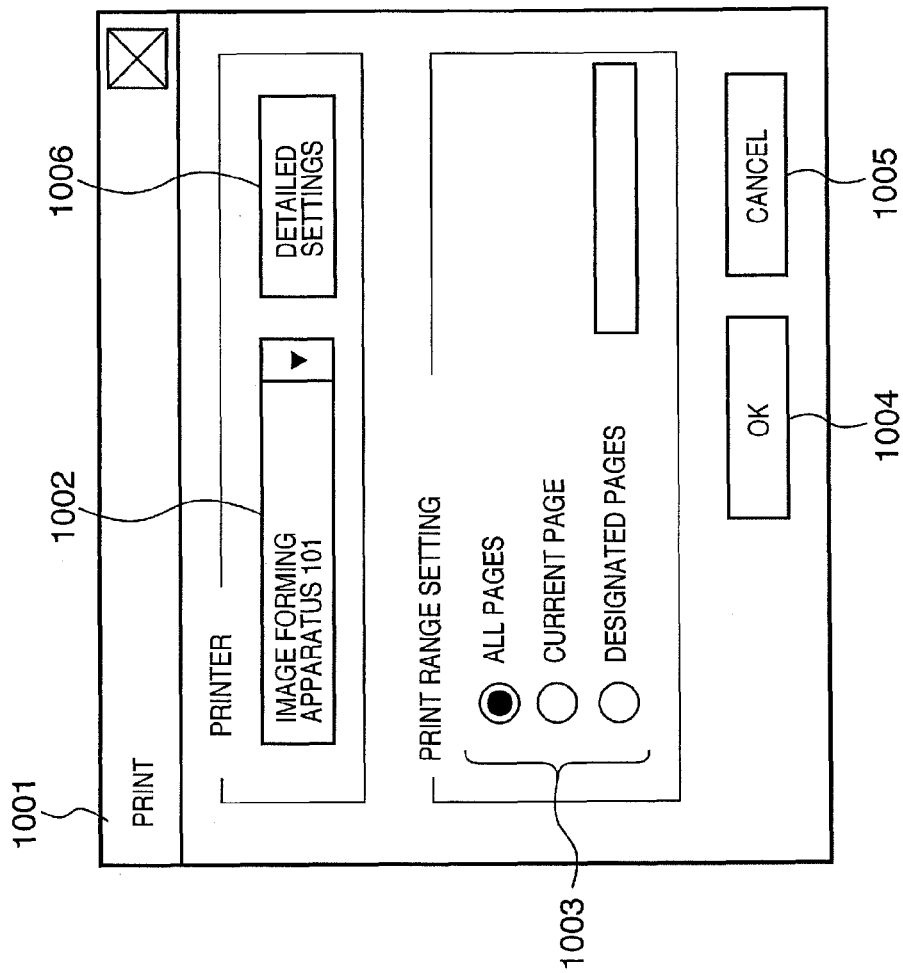
FIG. 10 is a diagram showing an example of a display screen of a printer driver.

FIG. 10 shows an example of the printer driver screen that is displayed when a document prepared with the computer terminal 106 is printed as a printer driver screen 1001. The printer driver screen 1001 is displayed on the computer terminal 106. On the printer driver screen 1001, a printer selected as an output printer is indicated in an output field 1002. The output field 1002 is constituted as a pull-down menu, and it is also possible to select another printer. In the example of FIG. 10, the image forming apparatus 101 is selected as the output printer.

In a print range setting 1003 for setting the print range of a document, it is possible to set whether to print all pages or specified pages of the document. On the printer driver screen 1001, an OK key 1004 and a cancel key 1005 are provided. When the OK key 1004 is pressed, conversion to PDL data for the pages of the document set in the print range setting 1003 is performed. The PDL data obtained by the conversion is sent out to the external controller 104 connected to the image forming apparatus 101, along with detailed settings for printing described below. When the cancel key 1005 is pressed, the printer driver screen 1001 is closed without the above conversion to PDL data and sending out of the PDL data.

Figure 11:
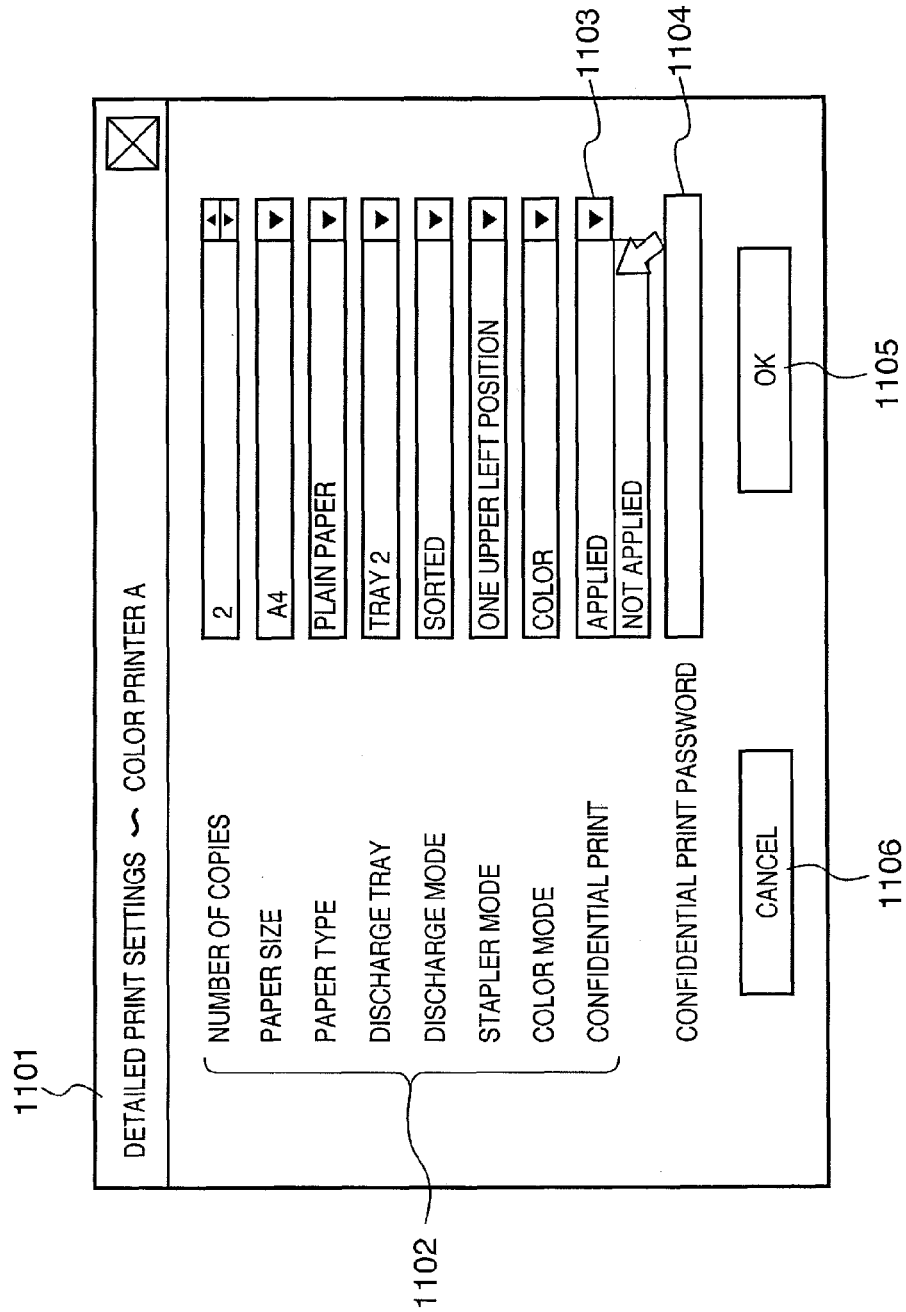
FIG. 11 is a diagram showing an exemplary detailed print setting screen of the printer driver.

A detailed setting key 1006 is provided on the printer driver screen 1001, and when the detailed setting key 1006 is pressed, a detailed print setting screen 1101 as shown in FIG. 11 is displayed. In the detailed print setting screen 1101, settings are performed for processes that can be performed with the selected image forming apparatus and the external controller. That is, it is possible to perform settings of various functions that can be performed with the image forming apparatus 101 and the external controller 104 using the detailed print setting screen 1101. Items whose settings can be performed with the detailed print setting screen 1101 include, for example, the number of printed copies or paper size, and layout, as illustrated in setting items 1102. In addition, whether or not confidential printing (described below) is performed and a password for the confidential printing can be set in fields 1103 and 1104 on the detailed print setting screen 1101. The user can perform desired settings with the detailed print setting screen 1101 described above.

When an OK key 1105 is pressed on the detailed print setting screen 1101, the detailed print setting screen 1101 is closed. Then, the printer driver screen 1001 shown in FIG. 10 is displayed again and the settings made with the detailed print setting screen 1101 are maintained in the computer terminal 106. When a cancel key 1106 is pressed, the printer driver screen 1001 is displayed again. However, in this case, settings made with the detailed print setting screen 1101 are not reflected by the computer terminal 106.

[Print Status Screen]

Figure 12:
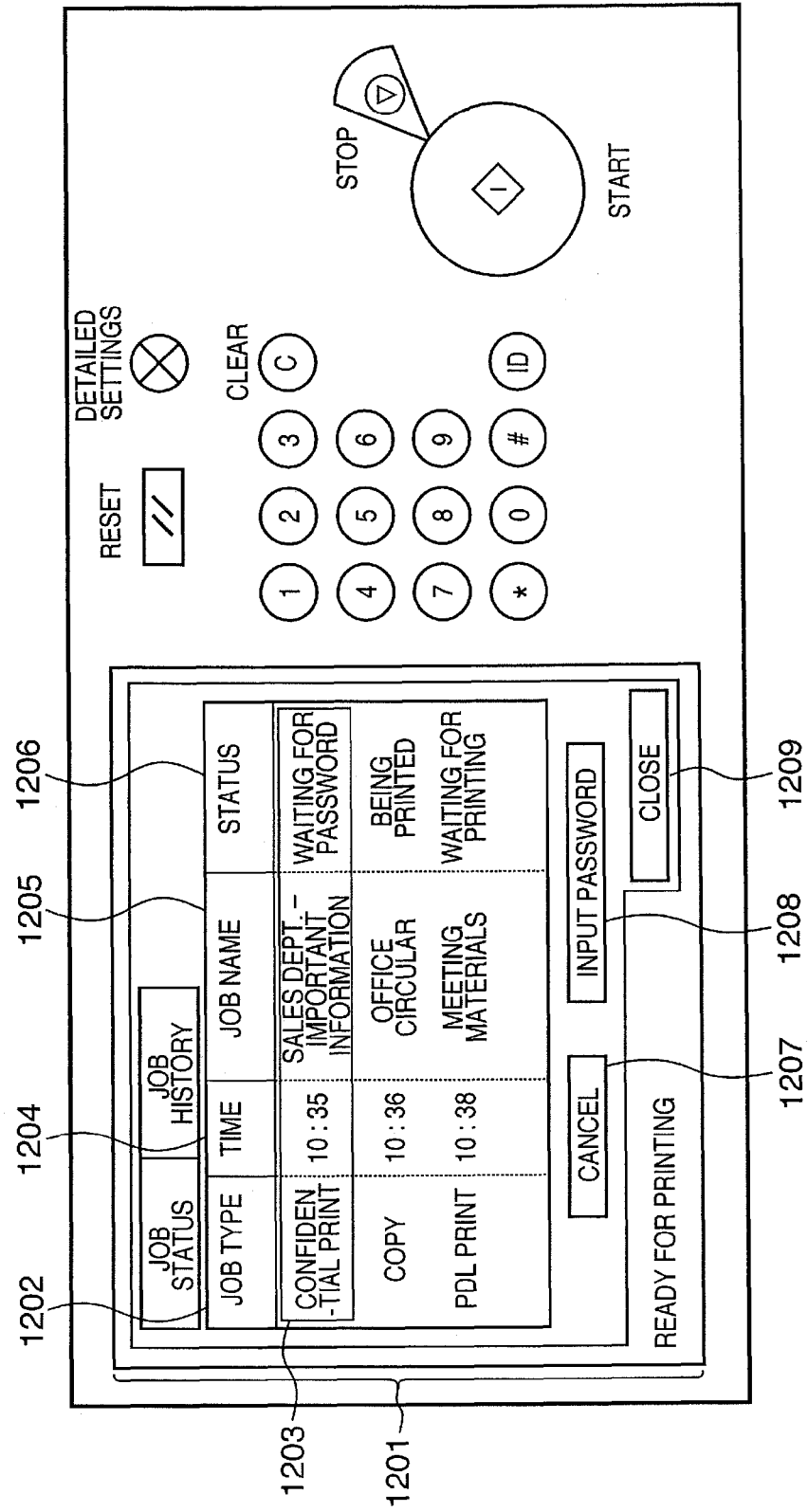
FIG. 12 is a diagram showing an exemplary display of a print status screen of the image forming apparatus.

Next, a print status screen of the operation unit 203 of the image forming apparatus 101 is described with reference to FIG. 12. A print status screen 1201 is a screen that is displayed when the system status key 405 on the LCD display screen 401 of the operation unit 203 is pressed.

The following items are displayed on the print status screen 1201:
<Job type 1202> displays job types such as copy or PDL print. A job with the confidential print setting is indicated as "confidential print" in the job type, as shown in field 1203.

<Receipt time 1204> indicates for each print job the time at which the corresponding job has been supplied to the image forming apparatus 101.

<Job name 1205> indicates the name of the job. In the case of a PDL print job, the document file name on the computer terminal 106 of the document whose printing is instructed to the printer driver is displayed.

<Status 1206> indicates the job processing status in the image forming apparatus 101.

The print status screen 1201 contains a cancel key 1207 for canceling a designated job, and a password input key 1208 for displaying a screen to input a password when printing subject to the confidential print is started. A close key 1209 is for closing the print status screen 1201 and returning the display on the LCD display screen 401 to the default screen in FIG. 4.

[Confidential Printing]

Next, confidential printing in accordance with the present embodiment is described with reference to FIGS. 13 to 18.

First, the user instructs printing of a desired document file with the printer driver screen 1001 provided by the printer driver that operates on the computer terminal 106. At this time, as described above, the user can perform settings as he/she desires with the detailed print setting screen 1101.

When the OK key 1004 on the printer driver screen 1001 is pressed, the computer terminal 106 transmits the print job, in the form of PDL data along with detailed settings, to the external controller 104. The external controller 104 receives the print job transmitted from the computer terminal 106 (containing the PDL data and detailed setting information).

Upon receiving the print job, the external controller 104 interprets the received print job. Then, the external controller 104 transmits to the device controller 204 of the image forming apparatus 101 the detailed setting information for printing of the print job containing settings made with the detailed print setting screen 1101 and image data obtained by developing the PDL data of the print job into an image.

Figure 13:
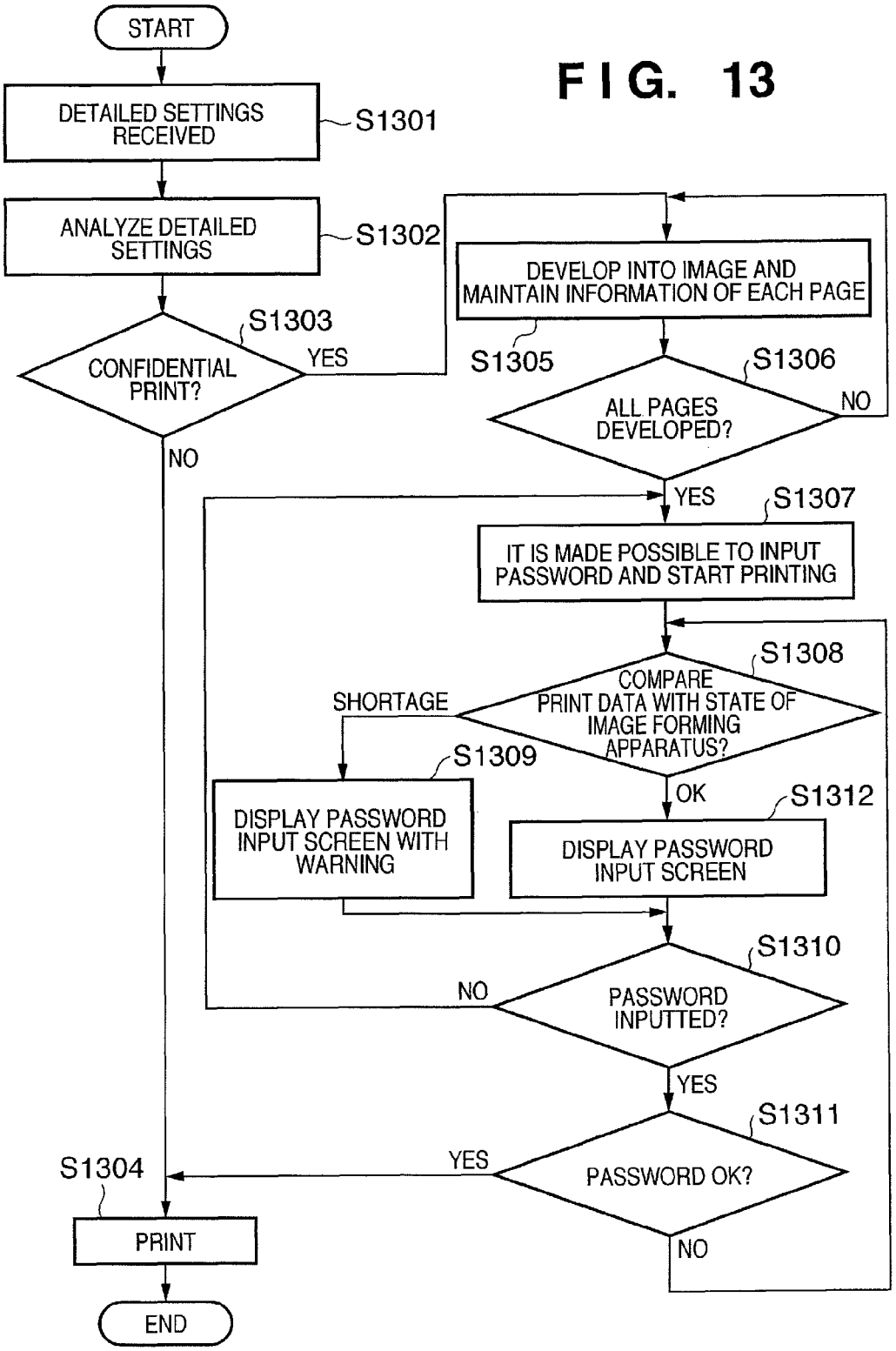
FIG. 13 is a flowchart describing the process of confidential printing according to the first embodiment.

Next, the operation of the image forming apparatus 101 is described. Processes in the steps shown in FIG. 13 are performed by the device controller 204 of the image forming apparatus 101. More specifically, for example, the processes shown in FIG. 13 are performed by the CPU 301 of the device controller 204 loading control programs stored in the HDD 305 into the working memory 302 and executing the programs.

Upon receiving the detailed setting information of the print job from the external controller 104 in step S1301, the image forming apparatus 101 analyzes the detailed setting information in step S1302. In step S1303, it is judged whether the image data of the print job transmitted from the external controller 104 is a job to be protected by confidential printing based on the analysis result. When it is judged that the job does not require confidential printing (the job does not need to be protected), the process moves from step S1303 to step S1304. In step S1304, the image obtained by interpreting and developing the PDL data in order is received from the external controller 104, and printed with the printer unit 202. It should be noted that if another job being printed is present in the device controller 204, the job is registered in a print waiting queue prepared in the HDD 305.

Figure 14:
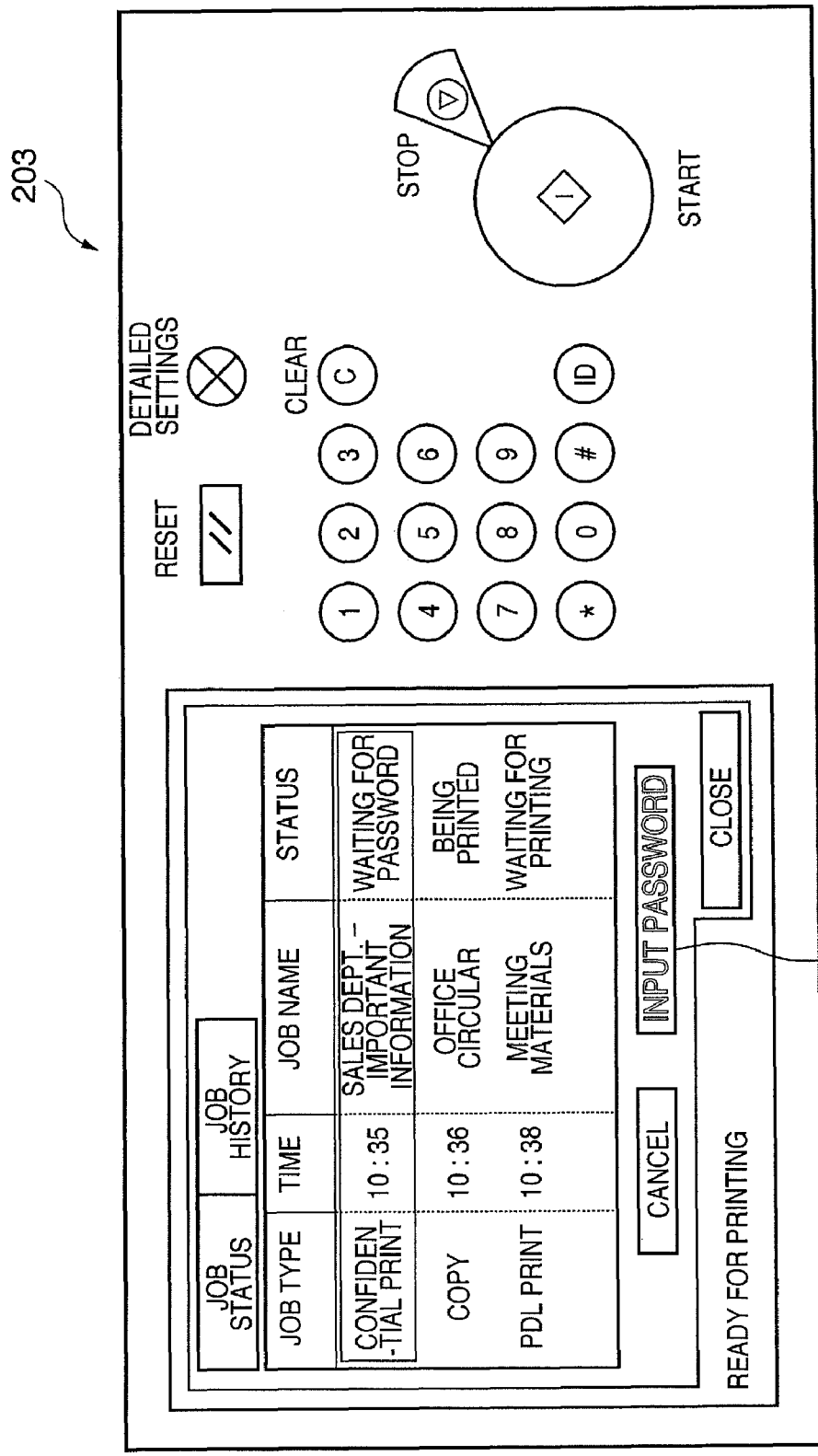
FIG. 14 is a diagram showing an exemplary display of the print status screen during image accumulation.

On the other hand, when the supplied job is judged as requiring confidential printing (the job needs to be protected) in step S1303, the process moves to step S1305. In step S1305, the device controller 204 stores the detailed setting information of the job in the HDD 305, and receives images obtained by interpreting and developing the PDL data in order from the external controller 104, and stores the same in the HDD 305. As a result, the job to be protected is accumulated in the HDD 305. Specifically, the image of each page and information such as the paper size or the paper type of each page are stored in the HDD 305. The process in this step S1305 continues until images of all the pages of the supplied job are accumulated in the HDD 305 (step S1306). In the case of a job that requires confidential printing, it is made impossible to start printing of the job until images of all the pages have been received and accumulated in the HDD 305. Accordingly, on the print status screen, a password input key 1401 for starting printing of the confidential print job is displayed in a grayed-out state as shown in FIG. 14, making it impossible to select the same.

Figure 15:
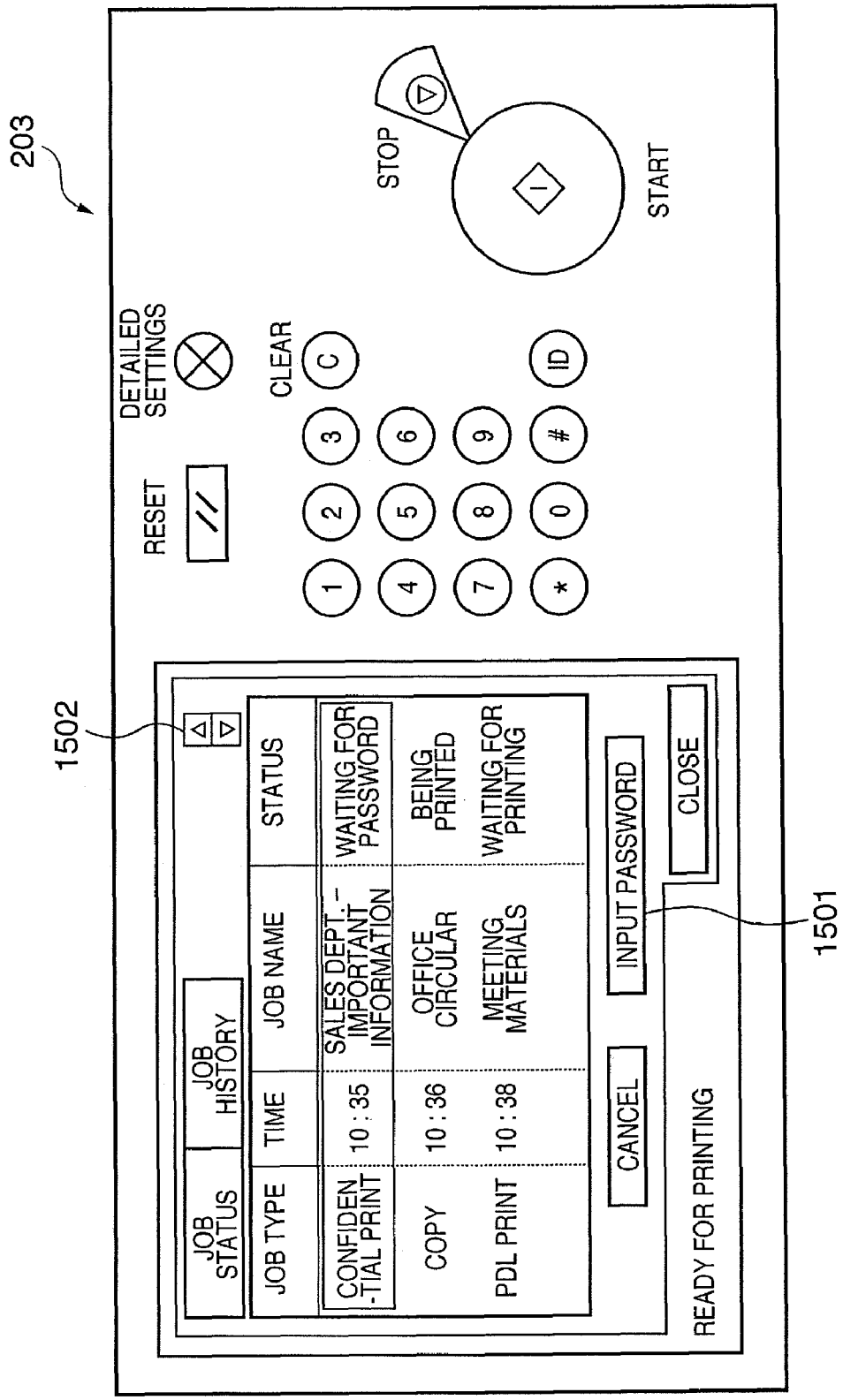
FIG. 15 is a diagram showing an exemplary display of the print status screen after image accumulation.

When images of all the pages of the supplied confidential print job have been accumulated in the HDD 305, the process moves from step S1306 to step S1307. In step S1307, a state in which the password input key 1401 cannot be selected (grayed-out state) is released and it is made possible to instruct to start printing by inputting a password. Consequently, the print status screen is displayed as a state in which a password input key 1501 can be operated, as shown in FIG. 15. Note that the job in a selected state in the job list may be switchable with an up and down key 1502, so that the desired confidential print job can be selected. In this manner, when a plurality of confidential print jobs are supplied and accumulated in the HDD 305, a desired confidential print job can be selected.

The process moves from step S1307 to step S1308 when the password input key 1501 is pressed. In step S1308, in order to print the job, the image forming apparatus 101 checks whether or not a recovery operation by the user will occur during printing due to paper shortage or the like.

In step S1305, the device controller 204 stores in the HDD 305 print settings made with the detailed print setting screen 1101, as well as print information 1601 such as the paper size and the paper type used for printing and the required number of sheets of such paper as shown in FIG. 16. For example, the print information 1601 contains information on the items indicated in 1602 to 1610. In this example, the items 1602 to 1610 respectively represent "number of copies", "paper size and number of sheets per copy", "paper type", "discharge tray", "discharge mode", "stapler mode", "color mode", "confidential print setting", and "confidential print password". 1611 indicates various items (attributes) concerning printing, and 1612 indicates values of the items. 1613 describes the meaning of each value indicated to describe the present embodiment, and need not be included in the actual print information 1601.

The job indicated by the print information 1601 in FIG. 16 uses 20 sheets of A4 plain paper (10 sheets×2 copies) and 30 sheets of A3 plain paper (15 sheets×2 copies), and discharges the printed output to a tray 2. In addition, the sheets are stapled once on the upper left corner of the paper, and printed in color printing mode. The device controller 204 checks the possibility of occurrence of a recovery operation based on the print information 1601. For example, the following checking is performed.

(1) When the setting of the item 1608 "color mode" is "color", it is checked whether sufficient toners of various colors (C, M, Y and K) for performing color printing are present in the image forming apparatus 101. When the setting in the item 1608 "color mode" is "monochrome", it is checked whether sufficient black (K) toner is present in the image forming apparatus 101. For example, when a toner thus checked is in a remaining amount warning state, it is determined that a recovery operation may occur.

(2) After judging the number of sheets of paper required for printing based on the item 1603 "paper size and number of sheets per copy" and the item 1604 "paper type", it is checked whether such a required number of required sheets of paper is present in the image forming apparatus 101. In the example of FIG. 16, checking is performed as to "whether 20 or more sheets of A4 plain paper remain" and "whether 30 or more sheets of A3 plain paper remain".

(3) When usage of a stapler is indicated in the item 1607 "stapler mode", it is checked "whether staples of the stapler are present".

(4) Based on the settings of the item 1602 "number of copies", the item 1603 "paper size and number of sheets per copy" and the item 1604 "paper type", it is checked whether an upper stacking limit of the discharge tray (tray 2) is reached during printing.

It should be noted that, for example, in order to determine whether the number of sheets required for printing is present in a sheet cassette, the image forming apparatus 101 is required to count the number of sheets present in the sheet cassette. The presence of paper can be detected by disposing a phototransmitter-receiver sensor whose optical axis direction coincides with the stacking direction of paper in the sheet cassette. Further, for example, by disposing a plurality of phototransmitter-receiver sensors in the paper stacking direction whose optical axis direction is perpendicular to the paper stacking direction, the number of sheets in the sheet cassette can be roughly detected. For example, by disposing four phototransmitter-receiver sensors in the paper stacking direction, the amount of paper in the sheet cassette can be detected as "0 to 20%", "20 to 40%", "40 to 60%", "60 to 80%" or "80% or more". Since the number of sheets in the sheet cassette with 100% of the paper remaining is known, due to the above configuration, the number of sheets remaining in the sheet cassette can be roughly known, thereby enabling the judgment of the above-described paragraph (2).

Alternatively, the following configuration can be given as an example of another method to determine the number of sheets remaining in the sheet cassette. The number of sheets in a full state in the sheet cassette is set in advance, and the sheet cassette is assumed to be full when paper supply is started. Then, the number of sheets used in the subsequent print operation is counted, and is subtracted from the number of sheets in a full state, thereby obtaining the number of sheets in the sheet cassette. With such a configuration, by replenishing sheets in the sheet cassette to a full state when paper supply is started, the exact number of sheets in the sheet cassette can be detected. Also in paragraph (3), it is apparent that the remaining number of staples may be recognized to check whether a sufficient number of staples are present.

Figure 17:
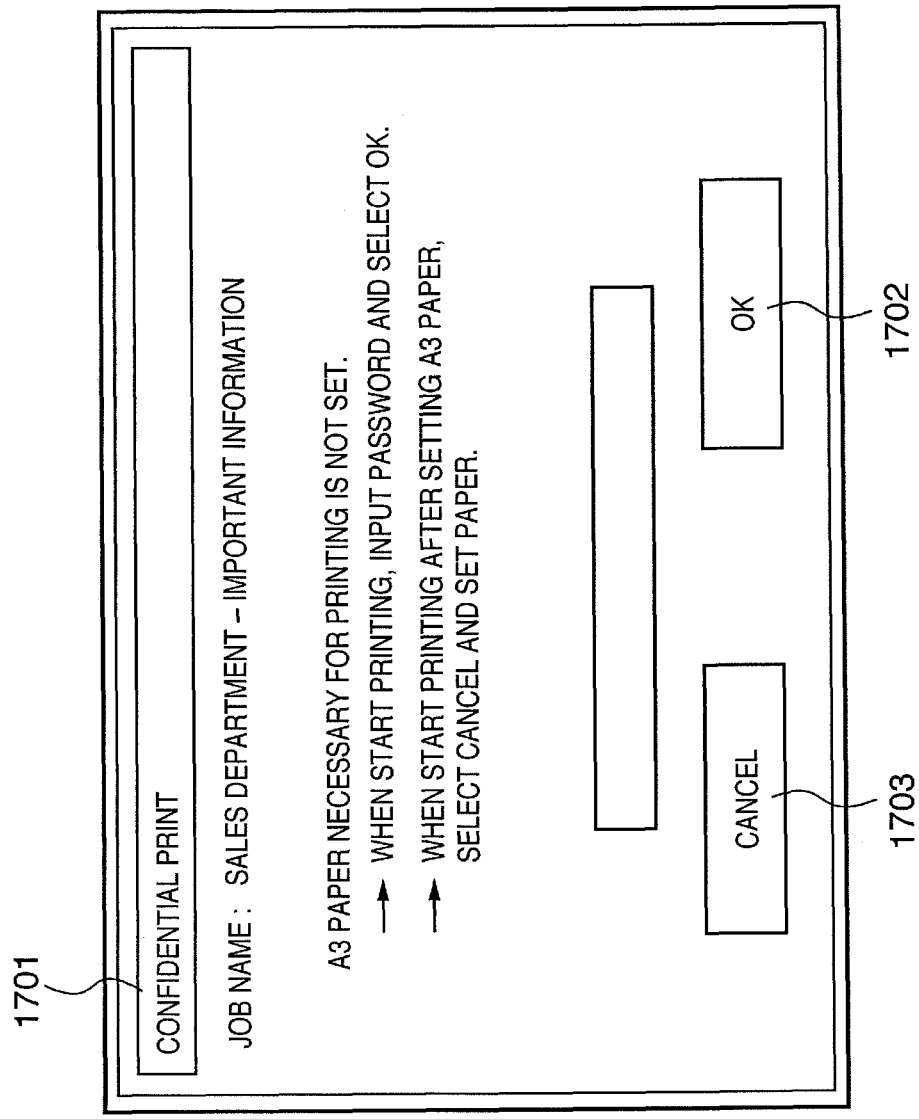
FIG. 17 is a diagram showing an example of a password input screen with warning according to the first embodiment.

As a result of the above-described checking measures in step S1308, when it is judged that a recovery operation by the user will occur due to paper shortage or the like during, for example, printing, the process advances to step S1309. In step S1309, as shown in FIG. 17, a password input screen 1701 is displayed that shows the fact that there is a paper shortage and the details thereof. In the password input screen 1701, when a password is inputted and an OK key 1702 is pressed, the process advances from step S1310 to step S1311. This is the procedure for when the user selects to start printing despite the risk of occurrence of the recovery operation. On the other hand, when a cancel key 1703 is pressed on the password input screen 1701, the process returns from step S1310 to step S1307. That is, the process can be restarted from job selection. Accordingly, when the user does not want to perform a recovery operation during confidential printing, the recovery operation predicted in the warning display can be performed before the printing is started by selecting the cancel key 1703.

Figure 18:
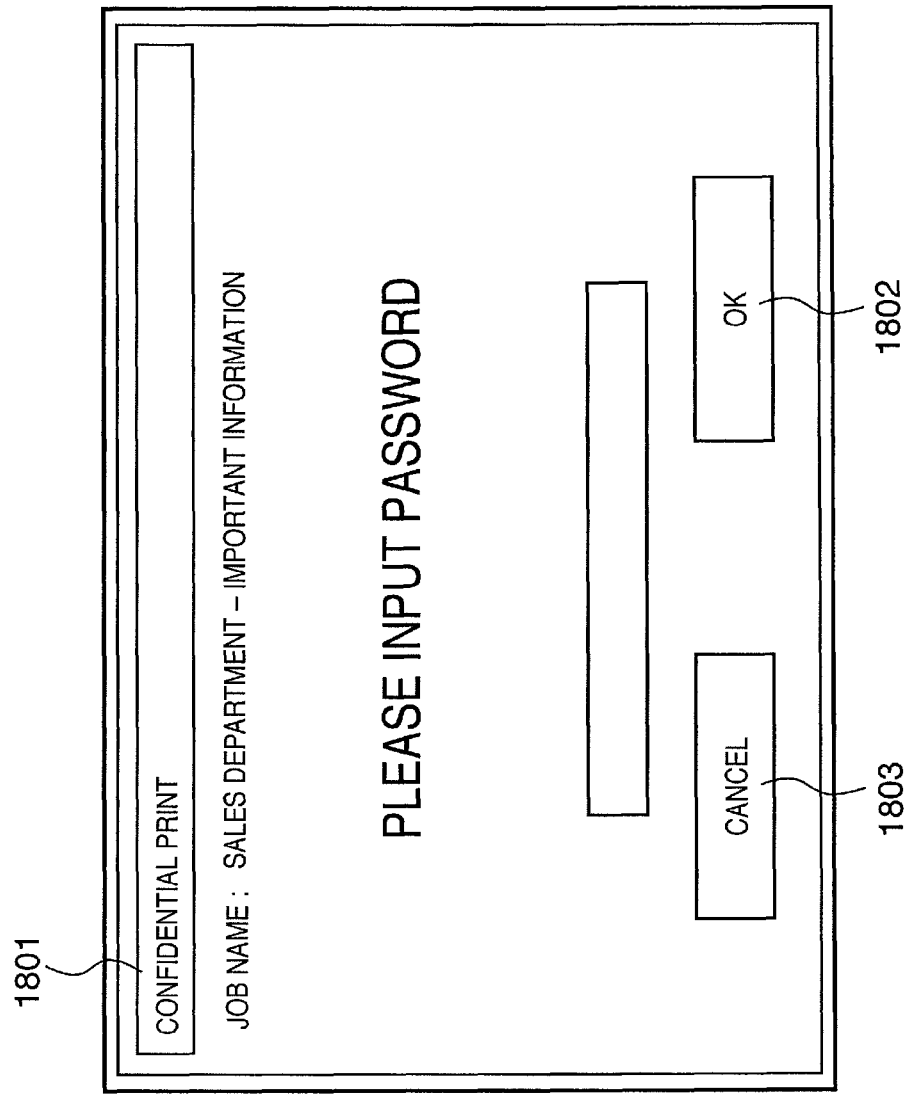
FIG. 18 is a diagram showing an example of a password input screen without warning according to the first embodiment.

In contrast, when it is judged that a recovery operation by the user due to paper shortage or the like will not occur during printing as a result of the checking in step S1308, the process advances to step S1312. In step S1312, a password input screen 1801 that does not contain a warning display as shown in FIG. 18 is displayed. Then, on the password input screen 1801, when a password is input and an OK 1802 key is pressed, the process advances from step S1310 to step S1311.

In step S1311, the password is verified. Specifically, it is determined whether the password inputted in the password input screen 1701 or the password input screen 1801 matches the password set in the detailed print setting screen 1101 (password stored in the item 1610 "confidential print password" of the print information 1601). When the passwords are determined to be a match, the process advances from step S1311 to step S1304, and printing of the subject job is started. In contrast, when the passwords are determined to be mismatched in step S1311, the process returns to step S1308 and becomes a password input waiting state in step S1309 or step S1312.

As described so far, since the presence of resources required for secure printing is confirmed before printing is started, it is possible to reduce the occurrence of an "out of paper" error or the like after starting printing. Consequently, it is possible to reduce the occurrence of a situation in which the user leaves the printing site for error recovery during confidential printing. As a result, the risk that a third party sees outputted materials during the absence of the user can be reduced, and consequently confidentiality can be maintained. Moreover, it is possible to prevent a situation in which the time required for confidential printing is prolonged due to error recovery for an event such as "out of paper" after starting printing. In short, it is possible to more reliably remove the error recovery operation during confidential printing, and to minimize the print time. Therefore, the risk that a third party sees the printed materials can be further reduced. Thus, confidentiality during secure printing can be increased.

In the above-described embodiment, in the job example shown in FIG. 16, it was checked whether the resources required to process the job, namely, 20 or more sheets of A4 plain paper and 30 or more sheets of A3 plain paper, staples of the stapler, toners of C, M, Y and K or the like, are present. In order to check the paper, it is necessary that the sizes and types of paper contained in each of the sheet cassettes are registered. Such registration can be achieved by recording on the HDD 305, for example, in a table format in which the sheet tray, and the paper size and paper type contained therein are associated with each other. While in the above-described embodiment the number of sheets contained in the sheet cassette can be detected, in the case that only a mechanism for detecting the presence of sheets in the sheet cassette is provided, the presence of resources required for the job is determined depending on whether the paper used for printing is present in the sheet cassette. Similarly, if the number of staples remaining in the stapler 805 can be detected, the presence of resources required for the job is judged by detecting whether staples sufficient for the number of printed copies designated by the job remain.

Second Embodiment

Figure 19:
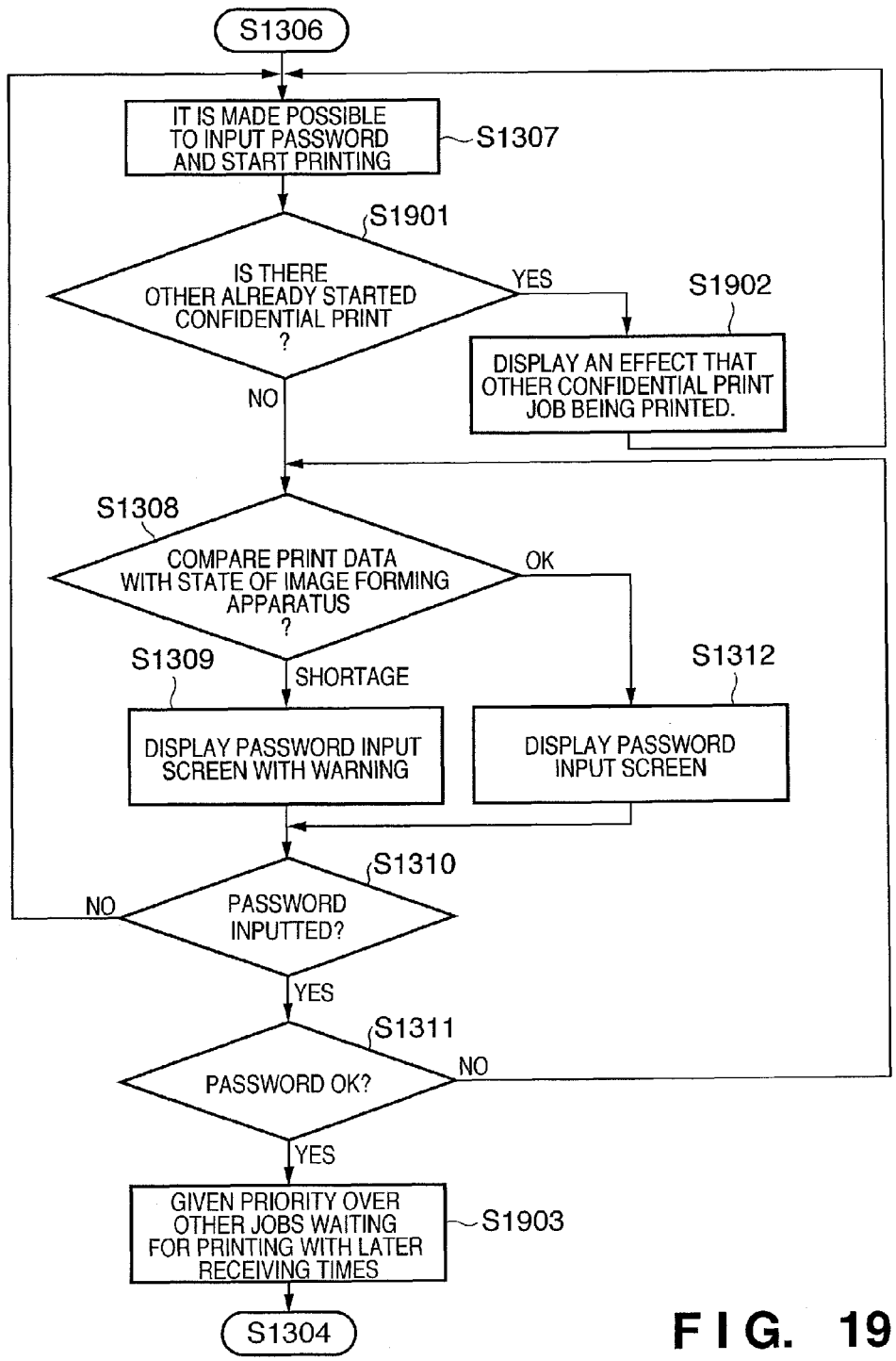
FIG. 19 is a flowchart describing the process of confidential printing according to a second embodiment.

In a second embodiment, in the confidential printing with the printing system of the first embodiment, printing of the confidential print job is started as soon as possible so as to improve the accuracy of the checking as to whether or not a recovery operation will occur (step S1308). More specifically, printing of other jobs is reduced as much as possible after the checking in step S1308 was performed, so as to suppress fluctuation in resources caused by processing other jobs, thereby relatively improving the accuracy of the checking in step S1308. The second embodiment is described below with reference to the flowchart in FIG. 19. It should be noted that processes shown in FIG. 19 are replaced with processes in step S1307 to step S1311 of the first embodiment (FIG. 13).

Figure 20:
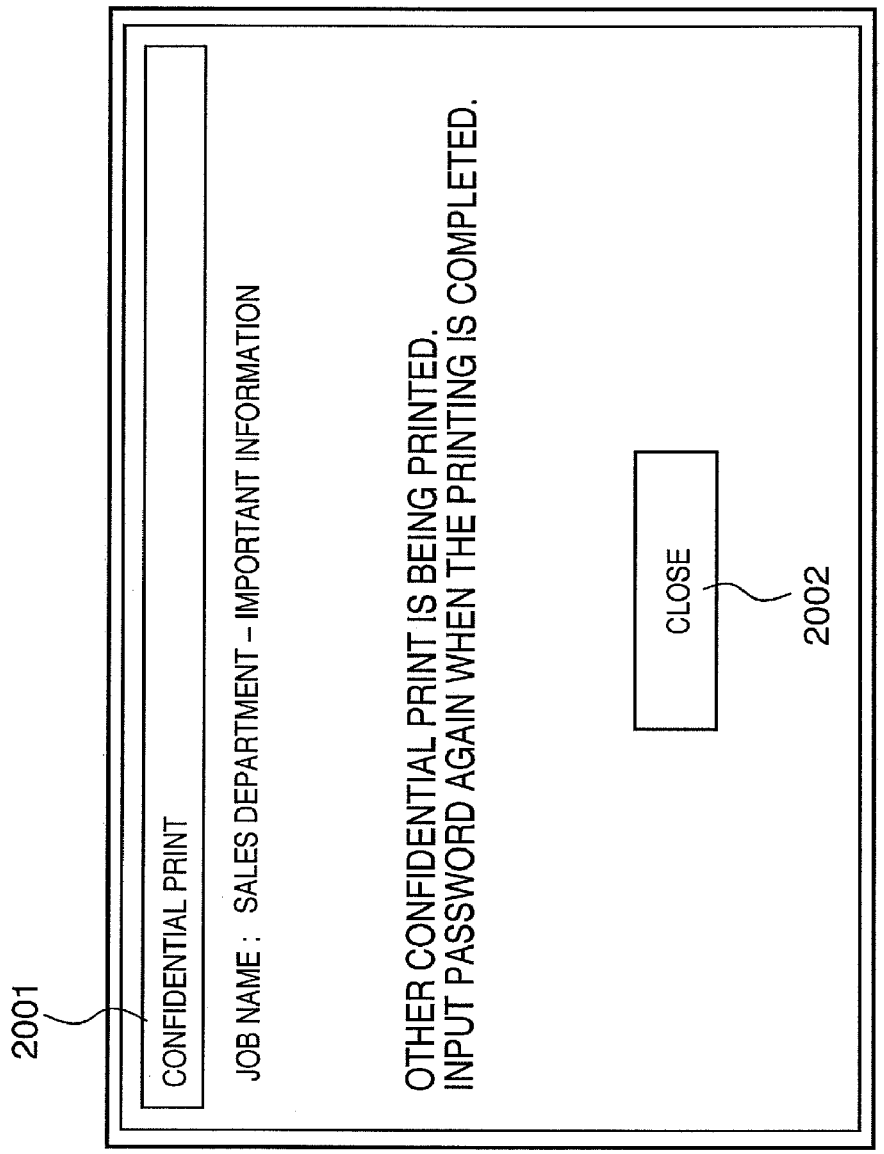
FIG. 20 is a diagram showing an exemplary screen displayed when printing of another confidential print job is being performed in the second embodiment.

When the password input key 1501 is pressed in step S1307, in step S1901, it is checked whether or not there is another confidential print job whose confidential printing has been already started. Here, when another confidential print job is being printed, the process moves to step S1902 and a screen 2001 indicating that another confidential print job is being performed as shown in FIG. 20 is displayed. When a close key 2002 is pressed, the process returns from step S1902 to step S1307. That is, the screen 2001 is closed and the print status screen as shown in FIG. 15 is displayed again. Accordingly, when another confidential print job is being performed, the permission to start the confidential printing of that job, which follows inputting a password for the job, is not given.

On the other hand, when it is determined in step S1901 that no other confidential print job is being printed, the processes shown in step S1308 to step S1312 are performed. The processes in step S1308 to step S1312 are as described in the first embodiment.

The password is verified in step S1311, and when the password is determined to be "OK", the process advances to step S1903. In step S1903, the image forming apparatus 101 compares the receiving times of other jobs listed on the print status screen 1201 with that of the confidential print job. If the receiving time of the confidential print job is earlier than those of the other jobs waiting for printing, the printing of the confidential print job is given priority so as to be printed first. FIG. 21 is a diagram illustrating a case where a confidential print job is given priority so as to be printed prior to "office circular" or "meeting material" jobs waiting for printing whose receiving times are later than that of the confidential print job.

With the processing described above, it is possible to prevent fluctuation in the state of resources, which is caused by consumption of paper by another print job being processed prior to the confidential print job, for example. As a result, the accuracy of the checking in step S1308 as to whether or not the recovery operation by the user will occur is improved.

It should be noted that the reason why it is checked in step S1901 whether or not another confidential print job is being printed is to avoid a situation in which only the confidential printing is performed as a result of the confidential print being processed preferentially, and non-confidential printing is not performed. Also when there are successive confidential print jobs, then other confidential print jobs are processed and paper or the like is consumed after the time of checking in step S1308 for a confidential print job whose printing is instructed at a later timing. In other words, the checking accuracy in step S1308 decreases. Such a situation can be avoided by making it impossible to input a password when another confidential print job is being printed in step S1901.

It should be noted that when the number of sheets contained in the sheet cassette can be detected, it is possible to judge whether a required number of sheets of paper for performing the confidential print remain even after paper has been consumed due to jobs that have been performed before the confidential print job. In this manner, with respect to resources whose remaining amount after consumption thereof due to jobs that are performed before the confidential print can be estimated, it is preferable to determine whether the resources required for the confidential print are present by referring to the remaining state thereof. In this manner, the judgment can be made while taking into account the effects of the jobs performed before the confidential print to the remaining state of resources. As a result, operability and confidentiality can be improved.

The above-described aspect is common to all embodiments. In other words, the configuration of the present embodiment assumes, as an example of printing resources required to complete printing of a target job, a required number of sheets of printing paper to complete printing of the target job. Alternatively, for example, toner or the like required to complete printing of a print target job also is, as an example of the printing resources, included in the printing resources to be confirmed by the job control carried out by a control unit (the control unit, for example, corresponds to the device controller 204 or the external controller 104) of the present embodiment. Also for example, a sheet processing material (sheet binding material) or the like such as sufficient staples to complete printing of a print target job for which a stapling request is made, is also subject to the control as an example of the printing resources required to complete printing of the target job. The image forming apparatus 101 of the present embodiment can be applied to apparatuses that are configured to use at least one of the printing resources described above. In addition, the above described method may be used as a method for the controlling unit of the present embodiment to confirm whether or not printing resources required to complete printing of the target job are present in the image forming apparatus 101 (available or not). However, the method is not limited to these examples, and any other method can be adopted.

For example, a configuration can be adopted in which an operator manually inputs information about the remaining amount of printing resources or the like via an operation unit 203 provided in the image forming apparatus 101, which corresponds to an example of a user interface unit (hereinafter referred to as the "UI unit") of the present embodiment. Alternatively, a configuration is also possible in which the operator manually inputs information about the remaining amount of printing resources or the like via the UI units (including the display device, etc.) of a host computer. The following is an example of this configuration. For example, the operator inputs via the UI unit the information with which the controlling unit can identify what kind of printing resources are required to complete printing of a target secure print job and the required amounts thereof, etc. Further, the operator also inputs via the UI unit additional information with which the controlling unit can identify which kind of resources are currently set in the image forming apparatus 101 and the set amount thereof, etc. Then, based on this information, the controlling unit of the present embodiment performs the above confirmations. After that, the controlling unit performs various job controls as described in the present embodiment. The present invention encompasses such a configuration as well. In this manner, any configuration is possible as long as the configuration can address the problems described in the section of "Description of the Related Art", without restriction on a specific confirmation method.

Third Embodiment

In the confidential printing with the system of the first embodiment, it is possible to adopt a configuration in which when it is determined in step S1308 that a recovery operation by the user will occur, the password input screen is not displayed so as to make it impossible to start printing. In such a case, for example, it is preferable to display a screen including only a warning (and not including the password input area) as shown in FIG. 22 in step S1309. Then, when a close key 2202 is pressed after a screen 2201 with warning only as shown in FIG. 22 is displayed, the process returns from step S1309 to step S1307. In this manner, even when an instruction to start inputting a password is received, printing is prohibited from being started when it is determined that a recovery operation will occur.

Job control that is common to all the embodiments of the present invention, including this third embodiment, is described below. A controlling unit provided in a system of the present embodiment (for example, the device controller 204 or the external controller 104) controls printing system 100 (or image forming apparatus 101) of the present embodiment as follows in order to address the problems described in the section of "Description of the Related Art" and to achieve the above-described effects. It should be noted that the image forming apparatus 101 is also referred to as a printing apparatus. Also, an image forming system including the present image forming apparatus 101 is also referred to as a printing system.

The controlling unit of the present embodiment (for example, the above-described device controller 204, or external controller 104) performs control such that a secure print job that corresponds to an example of the first type print job that requires authentication processing prior to printing can be received with the image forming apparatus 101 of the present embodiment. Also, the controlling unit performs control such that a non-secure print job that corresponds to an example of the second type print job that does not require authentication processing prior to printing can be received with the image forming apparatus 101 of the present embodiment. With respect to the image forming apparatus 101 that can receive a plurality of types of print jobs including the first type print job and the second type print job, the controlling unit performs control as described below, for example.

For example, when resources required to complete printing of a target job are not present (not prepared nor available) in the image forming apparatus 101, the controlling unit does not give permission to start printing of the job with the image forming apparatus 101 (prohibits to start printing). On the other hand, when resources required to complete printing of the target job are present in the image forming apparatus 101, the controlling unit causes printing of the job to be started with the image forming apparatus 101 (gives permission to start printing). The controlling unit performs control such that such a specific operation according to a situation (also referred to as a specific job control sequence) can be performed with the image forming apparatus 101. Based on such a configuration, the controlling unit performs control such that the specific operation can be performed with the image forming apparatus 101 when the target job is the first type print job, not the second type print job, of the first type print job and the second type print job.

Furthermore, based on such a configuration, the controlling unit controls that the specific operation should be performed for which type of job at which timing. As an example of this control, the controlling unit causes the specific operation to be performed with the image forming apparatus 101 when (1) print data of the first type print job is stored in the storage unit of the above-described HDD or the like, and (2) the confirmation processing as to whether or not resources required to complete printing of the target job are present in the image forming apparatus 101 is made with respect to the first type print job, of the first type print job and the second type print job.

By adopting the configuration described above, the problems described in the above section of "Description of the Related Art" can be addressed. Further, the present embodiment is configured so as to prevent another new problem such as a reduction in the job productivity of the entire system, which is caused by affecting other print jobs in exchange for maintaining confidentiality. As an example of this, the controlling unit performs the job control described below.

As described above, the controlling unit causes the specific operations to be performed with the image forming apparatus 101 when the target job is the first type print job, of the first type print job and the second type print job. While performing such control, the controlling unit performs different control to the second type print job (non-secure print job that does not require authentication processing prior to printing). If the specific operation performed with respect to the first type print job is referred to as a first print control sequence, the specific operation performed with respect to the second type print job is defined as a second print control sequence. As an example of this control, when the target job is the second type print job, the controlling unit gives permission to start printing the job with the image forming apparatus 101, even when resources required to complete printing of the job are not available in the image forming apparatus 101. In other words, with respect to the first type print job, as described above, the printing resources are secured in advance such that printing of the job is not interrupted from the start to the completion thereof. After that, printing is started after the authentication processing. As a result, a situation in which printing resources for the first type print job run out in mid-course from the start to the completion of the printing of the first type print job can be prevented. On the other hand, with respect to the second type print job, as described above, permission is given to start printing the same regardless of whether or not printing of the job is interrupted in mid-course from the start to the completion thereof, in other words, without securing printing resources in advance in the image forming apparatus 101. Specifically, the second type print job allows occurrence of a situation in which printing resources for the job run out in mid-course from the start to the completion of the printing.

Such a selective control is based on a scheme that is configured in accordance with the point to be focused on. For example, with respect to the latter control, although printing may stop in mid-course, the time from the receipt of a job to the print start of the first page of the job (so-called first copy on time, which is abbreviated as "FCOT") can be shorter than with the former control. This is because printing is started without confirming presence of resources required to complete the entire printing of the job. Describing this in further detail, resources required to complete the entire printing of the job refer to, in other words, printing resources in an amount required to complete printing of all the pages of the print data contained in the job in a designated number of copies. When the controlling unit confirms printing resources required for a certain job, such a confirmation becomes possible for the controlling unit only when print data of all the pages of a target job is stored in the storage unit such as the HDD. For example, there are image forming apparatuses that have a configuration in which the total number of pages of a certain job cannot be specified until the PDL or other print data for all the pages is received from a host computer, and developed into bitmaps to be stored in a memory of the apparatus. Also, there are printing apparatuses provided with a so-called copy function in which originals read with a scanner unit (such as the scanner unit 201) are printed with a printer unit (such as the printer unit 202). In such printing apparatuses (image forming apparatus 101), a configuration is assumed in which the total number of pages of the original contained in a job of the copy function cannot be specified until all pages of the original bundle are read via an ADF provided in the scanner unit 201 and the data of the entire pages is stored in the HDD. Therefore, when the first print control sequence is uniformly performed in the image forming apparatus 101 having a configuration in which the total number of print pages of the job cannot be specified until data of all the pages is accumulated in the memory, the FCOT of the second type job is of concern. For this reason, the controlling unit performs the second print control sequence for the second type print job.

For example, the first type print job can be processed with the first print control sequence for the following reason. As described above, the first type job is the secure print job. The secure print job is originally a job which is not subject to the control in which the image forming apparatus 101 automatically starts printing of the job upon receipt thereof with its printer unit 202. In other words, it is a job whose printing is not allowed to be started until authentication data is inputted by the user of the job via the UI unit of the image forming apparatus 101. Thus, the secure printing has the effect that printing is started when the user comes in front of the image forming apparatus 101, until then the print data is maintained in the memory of the image forming apparatus 101. In this manner, printing of the secure print job is not started, even if print data of the job is maintained in the memory of the HDD or the like, until the user who desires to start printing the same inputs a print start request for the job via the UI unit of the image forming apparatus 101. The print time is not significantly affected in case of the secure print job that stands by for printing with maintaining the print data in the memory of the HDD or the like in this manner. This is because accumulating the print data of all the pages of the secure print job in the memory such as the HDD can be completed, while the user moves from a host computer to the image forming apparatus 101 and inputs a print start request for the job via the UI unit of the image forming apparatus 101. Therefore, the above-described effect can be achieved without the above-described problem of FCOT. The selective control according to the above job nature can be performed with the controlling unit. When this configuration is described in another way, the controlling unit performs control as follows. The controlling unit makes it possible to perform the specific operation with the image forming apparatus 101, when the print start request for the first type print job is received from the user via the UI unit provided in the image forming apparatus 101. However, when the print start request for the first type print job has not been received from the user via the UI unit provided in the image forming apparatus 101, the controlling unit does not give permission to start printing the job regardless of whether or not resources required to complete printing of the job are available in the image forming apparatus.

An example of characteristics and effects of the configurations of the above-described first to third embodiments are described with a more specific example. For this purpose, the following configuration, which is different from the first to third embodiments, is examined.

For example, when an interrupting event occurs during a confidential print job after the print processing of the job is started with the image forming apparatus 101, the image forming apparatus 101 interrupts the print processing of the job. Then, the image forming apparatus 101 configures the print processing of the interrupted job according to, for example, instructions from the operation unit 203 provided in the image forming apparatus such that the print processing can be restarted. Such a configuration is examined below.

In such a configuration, if the configuration allows even a third party who is not the right user, to restart the print processing of the job, it is assumed that there is a risk that the third party may see printed materials of the confidential print job outputted after restarting the print processing.

Thus, for example, the following configuration is examined in order to solve the above-described problem.

For example, when printing of the interrupted confidential print job is restarted, a password input screen is displayed to request the input of a password. In this manner, it is considered possible to reduce the possibility that a third party other than the right user restarts the print processing of the interrupted confidential print job. Accordingly, it is considered possible to reduce the possibility that the printed materials that are outputted after the print processing of the job having been restarted is seen by a third party.

Even in such a configuration, printed materials that have been already outputted at the time of interruption of print processing are left on a discharge tray, and are exposed to the risk to be seen by a third party. As countermeasures for this problem, the user removes the printed material of the confidential print job outputted to the discharge tray. With such a measure, for example, it is thought possible to maintain confidentiality.

However, it is anticipated that a problem that it is difficult to address even with such a measure remains. For example, when certain finishing processing such as stapling is designated for a confidential print job, printed materials of the job that have been already outputted at the time of interruption of print processing are removed in mid-course. In such a case, it can be anticipated that finishing processing cannot perform to put the outputted printed materials of the job and remaining printed materials of the job that have not been outputted yet together as one bundle. In this way, it is anticipated that the problem remains that desired finishing processing cannot be performed for the job.

With respect to this problem, by reducing with the configurations of the first to the third embodiments the possibility that printing of the confidential print job is interrupted by an interrupting event, it is possible to reduce the possibility that the printed materials of the job are seen by a third party. In addition, it is possible to address a new problem such as the one that desired finishing processing is not performed for the confidential print job in exchange for reducing the possibility that the printed materials of the job are seen by a third party.

It is also possible to prevent another new problem, such as that addressing the above-described problems affects the productivity of other jobs.

With the configurations of the first to the third embodiments, the possibility that the printed materials of the confidential print job are seen by a third party can be reduced. In addition, it is possible to address a new problem that desired finishing processing is not performed for the confidential print job. Furthermore, it is possible to prevent another new problem, such as that addressing the above-described problems affects the productivity of other jobs.

The configuration that can address these problems is also one of the characteristics of the present application.

Further, an example of characteristics and effects of the above-described first to third embodiments is described with reference to another specific example. For this purpose, the following configuration, which is different from the first to third embodiments, is examined.

For example, the image forming apparatus 101 receives, along with PDL data of a print job for which a print request was made, print setting information for the print job, and saves the received PDL data and the print setting information in the HDD. Next, the image forming apparatus 101 judges whether or not the print job is a confidential print job based on the print setting information. When the image forming apparatus 101 judges that the print job is the confidential print job, it predicts whether or not an interrupting event will occur during the print job before starting print processing of the print job. Then, when the image forming apparatus 101 predicts that the interrupting event will occur, it prohibits printing of the print job from being started. Subsequently, the image forming apparatus 101 performs a process to develop the PDL data of the print job to image data after receiving an instruction to start printing of the print job, and performs printing. Such a configuration will be examined.

With such a configuration, when an instruction is provided to start printing of a print job whose start of printing has been prohibited, it is assumed that it takes time until printing of the first page is actually started after the instruction to start printing. This is because time is required to develop the PDL data of the print job to image data after the instruction to start printing of the print job, before printing of the first page is started. Further, time to predict whether or not an interrupting event will occur during the print job is also required.

On the other hand, as in the above-described first to third embodiments, the image forming apparatus 101 maintains in advance image data obtained by developing the PDL data of the confidential print job in the HDD, when it is prohibited to start printing of the job. Moreover, a configuration is adopted in which whether or not an interrupting event will occur during the confidential print job is predicted before the instruction to start printing is provided. Accordingly, when printing a print job whose start of printing has been prohibited is restarted, it is possible to address a problem that time is required after the instruction to start printing, before printing of the first page is started.

For example, the image forming apparatus 101 predicts that an interrupting event will occur during the confidential print job when resources required to complete printing of the confidential print job are not present in the image forming apparatus 101. Therefore, an example of the method for the image forming apparatus 101 to determine whether or not resources required to complete printing of the confidential print job are present in the image forming apparatus 101 is described below.

Initially, the image forming apparatus 101 assesses resources required to complete printing of the confidential print job. Next, based on the assessed required resources, the image forming apparatus 101 judges whether or not resources required to complete the printing are present in the image forming apparatus 101. Methods for these will be individually described more specifically.

First, the method with which the image forming apparatus 101 assesses the amount of resources required to complete printing of the confidential print job is described.

The image forming apparatus 101 obtains the number of pages required to complete printing of the job based on developed image data, for example. Then, the image forming apparatus 101 calculates the number of sheets required to complete printing of the job based on the number of pages, and information relating to print layout and simplex/duplex printing setting contained in the detailed setting information of the job.

For example, the image forming apparatus 101 develops PDL data of a received job into image data and assesses that image data corresponds to 80 pages. When 2 in 1 printing is set as the print setting information of the job, the image forming apparatus 101 calculates that 40 sheets of paper (80 pages÷2) will be discharged to complete printing of the job. Moreover, when the two-sided printing is further set in addition to 2 in 1 printing as the print setting information of the job, the image forming apparatus 101 calculates that 20 sheets of paper (80 pages÷2÷2) will be discharged. That is, the image forming apparatus 101 develops PDL data into image data to obtain the total number of pages of a job, and divides the obtained number of pages with the number of pages to be printed on one sheet of paper, so as to obtain the number of sheets of paper required to complete the job.

In this manner, the image forming apparatus 101 assesses the amount of resources required to complete printing of the confidential print job.

Next, the image forming apparatus 101 predicts whether or not an interrupting event will occur during print processing of the target confidential print job based on the assessed required resources. As an example of the method for predicting occurrence of the interrupting event, a method with which the image forming apparatus 101 judges whether or not the required resources are present in the image forming apparatus 11 is described.

For example, the image forming apparatus judges whether or not a required number of sheets of paper to complete printing of the target confidential print job is present in the sheet cassette 722 or 723 (hereinafter, the sheet cassette 722 or 723 is merely referred to as sheet cassette). For this purpose, the image forming apparatus 101 is required to maintain information on the number of sheets of paper in the sheet cassette.

Initially, a method for the image forming apparatus 101 to maintain the information on the number of sheets of paper is described. When it is detected by a sensor provided in the sheet cassette for example, that paper was replenished in the sheet cassette, the image forming apparatus 101 determines that the sheet cassette is replenished with paper to a full state. For example, when it is detected that paper was replenished in the sheet cassette that can contain 500 sheets of paper, the image forming apparatus 101 determines that the sheet cassette contains 500 sheets of paper. Then, the image forming apparatus 101 stores in the HDD the information that the sheet cassette contains 500 sheets of paper.

After that, when paper is outputted, the image forming apparatus 101 counts the number of the outputted sheets of print paper with a counter, for example, and subtracts the counted value from the number of sheets of paper stored in the HDD. For example, when the image forming apparatus 101 counts 20 sheets of paper that have been discharged, it subtracts 20 from 500, which is the number of sheets of paper in the sheet cassette, and stores in the HDD the information that 480 sheets of paper are left in the sheet cassette.

With such a method, the image forming apparatus 101 obtains information on the number of sheets of paper in the sheet cassette.

Then, the image forming apparatus 101 compares the number of sheets required to complete the target confidential print job with the number of sheets of paper in the sheet cassette. The image forming apparatus 101 determines that there are sufficient sheets of paper in the sheet cassette when the number of sheets of paper in the sheet cassette is larger than the number of sheets of paper required to complete the target confidential print job.

In this manner, the image forming apparatuses 101 of the first to third embodiments judge whether or not the required resources are present in the image forming apparatus 101.

In addition, when a received job is a confidential print job, the image forming apparatus 101 of the first to third embodiments do not give permission to start print processing of the job, until the job is selected as the target job and the password thereof is inputted. As a result, when the received job is a confidential print job, the image forming apparatus 101 performs the following processes after receipt of the job until the password thereof is inputted: The image forming apparatus 101 performs a process of developing PDL data into image data. Furthermore, the image forming apparatus 101 performs confirmation processing as to the presence of resources required to complete the printing of the job after the job is received, before the printing is started as a result of the password being inputted.

Consequently, the image forming apparatus 101 of the first to third embodiments do not have to perform the above processes after the user provides an instruction to start printing of the job, and therefore do not have the problem that time is required before output of the first page of the job is started by the image forming apparatus 101.

In this manner, with the configurations of the first to third embodiments, it is possible to address the problem that when printing of a print job whose start of printing has been prohibited is restarted, time is required after the user provides the instruction to start the printing until printing of the first page is started.

The configuration that can address such a problem is also one of the characteristics of the present application.

It should be noted that the resources required to complete the confidential print job described in each of the above-described embodiments refer to resources used to print the job after the print processing of the job has been started until the completion thereof. Accordingly, for example, when resources required to complete the confidential print job are not present in the image forming apparatus 101, the resources in the image forming apparatus 101 run out and the print processing is interrupted after the image forming apparatus 101 has started printing of the job before the completion thereof. On the other hand, when resources required to complete the confidential print job are present in the image forming apparatus 101, printing of the job can be completed without being interrupted in the mid-course of the print processing of the job.

As a result of considering characteristics and productivity of each of plural types of jobs described above, the present embodiment is configured to perform the above-described control. However, a configuration may be adopted in which the controlling unit controls the image forming apparatus 101 such that the image forming apparatus 101 operates based on the first print control sequence regardless of whether the target job is the first type print job or the second type print job. It is possible with such a configuration to achieve an effect of simplifying apparatuses or the like. However, even with such a configuration, the configuration is such that at least the problems involving the secure print job can be addressed.

Other Embodiments

In the above-described embodiments, a print job is developed into images with the external controller 104, and the images are accumulated in the HDD of the image forming apparatus 101. However, there is no limitation to this. It is also possible that the image forming apparatus 101 has functions as a printer, and develops a print job sent from the computer terminal 106 into images for itself to accumulate the same in the HDD. In this case, the external controller 104 can be omitted.

Also in the above-described embodiments, the confidential print job is maintained in the HDD in the form of a developed image. However, there is no limitation to this. The confidential print job may be maintained in the form of PDL data and detailed setting information transmitted from the external computer terminal. In this case, the PDL data is developed into images when authentication is obtained using a password and printing is actually performed.

In the above-described embodiments, when it is judged that resources required to perform the confidential printing will run out, such an effect is displayed before a password (authentication information) is inputted. However, when it is judged that the resources will run out, it is sufficient if such an effect is informed before starting the confidential printing to take necessary countermeasures. Therefore, a configuration is also possible in which a warning to the effect that the resources will run out is provided after the authentication information is inputted and the input of the authentication information is canceled.

It should be noted that the present invention includes a case where a software program is provided to a system or an apparatus directly or remotely, and the functions of the embodiments described above are achieved by the computer of the system or the apparatus reading out the provided program code and executing the same. In this case, the provided program is a program that supports the flowchart shown in the drawings with respect to the embodiments.

As a result, program code that is installed on a computer in order to realize the function processing of the present invention on the computer also realizes the present invention. Specifically, the present invention includes computer programs for realizing the function processing of the present invention.

In such a case, the computer programs may be in the form of a program executed by an object code or an interpreter, script data supplied to an OS or the like, so long as they function as a program.

Recording media to provide the program include, for example, a floppy (registered trademark) disk, hard disk, optical disk, magnetic optical disk, MO, CD-ROM, CD-R, CD-RW, magnetic tape, nonvolatile memory card, ROM, DVD (DVD-ROM, DVD-R).

Other methods for providing the program include downloading the computer program of the present invention to a storage medium such as a hard disk from an internet website by accessing the website with a browser of a client computer. In this case, the downloaded program may be a compressed file provided with an automated-install function. Also, the functions of the embodiments can be achieved by program codes constituting the program of the present invention being divided into a plurality of files, and each of which being downloaded from different websites. In short, a WWW server that allows a plurality of users to download program files for realizing the function processing of the present invention on the computer is also included in the present invention.

It is also possible that the program of the present invention is encrypted and stored in a storage medium such as a CD-ROM, and distributed to the user. In this case, it is possible to allow a user who has satisfied predetermined conditions to download key information to decrypt from a website through Internet, so that the user executes the encrypted program with the key information to install the program on the computer.

In addition to realizing the functions of the above-described embodiments by a computer executing a program read out, the functions of the embodiments may be realized in cooperation with an OS or the like that operates on the computer based on instructions of the program. In this case, the OS or the like performs part or the whole of actual processing, and the functions of the above-described embodiments are realized by the processing.

Furthermore, part or the whole of the functions of the above-described embodiments may be realized by a program read out from a recording medium being written in a memory provided in a function expansion board inserted in a computer or a function expansion unit connected to a computer. In this case, after the program is written in the function expansion board or the function expansion unit, a CPU or the like of the function expansion board or the function expansion unit performs part or the whole of actual processing, based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2005-347937, filed Dec. 1, 2005 and No. 2006-293156, filed Oct. 27, 2006 which are hereby incorporated by reference herein in their entirety.

What is claimed is:

1. A printing system comprising:
a receiving unit configured to receive print data generated by a printer driver;
a determination unit configured to determine whether a target job is a first type of print job in which printing the print data starts after completion of developing all of the print data into an image or a second type of print job in which printing the print data starts before completion of developing all of the print data into an image; and
a printing unit configured to:
start printing an image based on image data developed from the received print data if it is confirmed, based on the developed image data, that the quantity of the resource required to complete the printing exists in the printing system, in a case where the determination unit determines that the target job is the first type of print job; and
start printing an image without confirming that the quantity of the resource required to complete the printing exists in the printing system in a case where the determination unit determines that the target job is the second type of print job.

2. The system according to claim 1, wherein the printing unit starts printing an image based on the developed image data if it is confirmed that the number of print sheet resource required to complete the printing exists in the printing system, the number of print sheet resource being determined based on the developed image data.

3. The system according to claim 1, wherein the printing unit starts printing an image based on the developed image data if it is confirmed that quantity of toner resource required to complete the printing exists in the printing system, the quantity of toner being determined based on the developed image data.

4. The system according to claim 2, wherein the printing unit starts printing an image based on the developed image data if it is confirmed that quantity of toner resource required to complete the printing exists in the printing system, the quantity of toner being determined based on the developed image data.

5. A control method printing system comprising:
a receiving step of receiving print data generated by a printer driver;
a determination step of determining whether a target job is a first type of print job in which printing the print data starts after completion of developing all of the print data into an image or a second type of print job in which printing the print data starts before completion of developing all of the print data into an image; and
a printing step of:
starting printing an image based on image data developed from the received print data if it is confirmed, based on the developed image data, that the quantity of the resource required to complete the printing exists in the printing system, in a case where it is determined that the target job is the first type of print job; and
start printing an image without confirming that the quantity of the resource required to complete the printing exists in the printing system in a case where it is determined that the target job is the second type of print job.

* * * * *